(12) United States Patent
Connell et al.

(10) Patent No.: US 12,240,295 B2
(45) Date of Patent: *Mar. 4, 2025

(54) SYSTEMS AND METHODS FOR CONTROLLING A VEHICLE HVAC SYSTEM

(71) Applicant: Bergstrom, Inc., Rockford, IL (US)

(72) Inventors: Brett S. Connell, Winnebago, IL (US); Aaron D. Sullivan, Winnebago, IL (US); Brett J. Herrmann, Rochelle, IL (US); Terry Zeigler, Byron, IL (US)

(73) Assignee: Bergstrom, Inc., Rockford, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,090

(22) Filed: May 25, 2023

(65) Prior Publication Data

US 2023/0382197 A1 Nov. 30, 2023

Related U.S. Application Data

(63) Continuation of application No. 17/560,216, filed on Dec. 22, 2021, now Pat. No. 11,712,946, which is a
(Continued)

(51) Int. Cl.
*B60H 1/32* (2006.01)
*B60H 1/00* (2006.01)

(52) U.S. Cl.
CPC ....... *B60H 1/3208* (2013.01); *B60H 1/00657* (2013.01); *B60H 1/00742* (2013.01);
(Continued)

(58) Field of Classification Search
CPC .............. B60H 1/3208; B60H 1/00657; B60H 1/00742; B60H 1/00778; B60H 1/00985;
(Continued)

(56) References Cited

U.S. PATENT DOCUMENTS 2,156,426 A 5/1939 Lloyd Brown et al.
2,722,050 A 11/1955 Shank
(Continued)

FOREIGN PATENT DOCUMENTS

CN 1468409 A 1/2004
CN 2883071 Y 3/2007
(Continued)

OTHER PUBLICATIONS

Alfa Laval Website http://www.alfalaval.com/ecore-Java/WebObjects/ecoreJava.woa/wa/shoNode?siteNodeID=1668&cont . . . ; date last visited May 18, 2007; 1 page.
(Continued)

*Primary Examiner* — Steve S Tanenbaum
(74) *Attorney, Agent, or Firm* — Morgan, Lewis & Bockius LLP

(57) ABSTRACT

Disclosed are climate systems for vehicles and methods for controlling the climate systems. In some implementations, a climate system includes: (1) a temperature sensor configured to measure a temperature within the compartment of the vehicle; (2) a first compressor powered by an engine of the vehicle to compress a refrigerant; (3) a second compressor driven by an electric motor to compress the refrigerant; and (4) a controller electrically coupled to the first compressor and the second compressor. The controller configured to: (1) calculate a thermal load of the compartment based on a difference between a desired temperature and a measured temperature; and, (2) based on the calculated load, selectively activate: (i) the engine, (ii) the first compressor, and/or (iii) the second compressor.

18 Claims, 7 Drawing Sheets

Related U.S. Application Data continuation of application No. 16/894,728, filed on Jun. 5, 2020, now Pat. No. 11,241,939, which is a continuation of application No. 15/439,865, filed on Feb. 22, 2017, now Pat. No. 10,675,948.

(60) Provisional application No. 62/454,281, filed on Feb. 3, 2017, provisional application No. 62/401,756, filed on Sep. 29, 2016.

(52) U.S. Cl.
CPC ..... B60H 1/00778 (2013.01); B60H 1/00985 (2013.01); B60H 1/323 (2013.01); B60H 2001/3261 (2013.01); B60H 2001/3272 (2013.01); B60H 2001/3273 (2013.01); B60H 2001/3277 (2013.01); B60H 2001/3282 (2013.01); B60H 2001/3294 (2013.01)

(58) Field of Classification Search
CPC ............ B60H 1/323; B60H 2001/3273; B60H 2001/3277; B60H 2001/3282; B60H 2001/3294; B60H 2001/3261; B60H 2001/3272
USPC .......................................................... 62/230
See application file for complete search history.

(56) References Cited

U.S. PATENT DOCUMENTS

| | | |
|---|---|---|
| 2,789,234 A | 6/1956 | Lambert et al. |
| 3,176,502 A | 4/1965 | Cizek et al. |
| 3,225,819 A | 12/1965 | Stevens |
| 3,360,958 A | 1/1968 | Miner |
| 3,590,910 A | 7/1971 | Lorenz |
| 3,627,030 A | 12/1971 | Lorenz |
| 3,807,087 A | 4/1974 | Staats |
| 3,844,130 A | 10/1974 | Wahnish |
| 3,880,224 A | 4/1975 | Weil |
| 3,885,398 A | 5/1975 | Dawkins |
| 3,938,349 A | 2/1976 | Ueno |
| 3,948,060 A | 4/1976 | Gaspard |
| 3,995,443 A | 12/1976 | Iversen |
| 4,015,182 A | 3/1977 | Erdman |
| 4,034,801 A | 7/1977 | Bermstein |
| 4,071,080 A | 1/1978 | Bridgers |
| 4,217,764 A | 8/1980 | Armbruster |
| 4,266,405 A | 5/1981 | Trask |
| 4,271,677 A | 6/1981 | Harr |
| 4,280,330 A | 7/1981 | Harris et al. |
| 4,324,286 A | 4/1982 | Brett |
| 4,359,875 A | 11/1982 | Ohtani |
| 4,383,802 A | 5/1983 | Gianni et al. |
| 4,391,321 A | 7/1983 | Thunberg |
| 4,412,425 A | 11/1983 | Fukami et al. |
| 4,448,157 A | 5/1984 | Eckstein et al. |
| 4,459,519 A | 7/1984 | Erdman |
| 4,577,679 A | 3/1986 | Hibshman |
| 4,604,036 A | 8/1986 | Sutou et al. |
| 4,617,472 A | 10/1986 | Slavik |
| 4,641,502 A | 2/1987 | Aldrich et al. |
| 4,658,593 A | 4/1987 | Stenvinkel |
| 4,667,480 A | 5/1987 | Bessler |
| 4,694,798 A | 9/1987 | Kato et al. |
| 4,748,825 A | 6/1988 | King |
| 4,825,663 A | 5/1989 | Nijar et al. |
| 4,841,733 A | 6/1989 | Dussault et al. |
| 4,856,078 A | 8/1989 | Konopka |
| 4,893,479 A | 1/1990 | Gillett et al. |
| 4,897,798 A | 1/1990 | Cler |
| 4,905,478 A | 3/1990 | Matsuda et al. |
| 4,945,977 A | 8/1990 | D'Agaro |
| 4,947,657 A | 8/1990 | Kalmbach |
| 4,952,283 A | 8/1990 | Besik |
| 4,982,576 A | 1/1991 | Proctor et al. |
| 5,025,634 A | 6/1991 | Dressler |
| 5,046,327 A | 9/1991 | Walker |
| 5,067,652 A | 11/1991 | Enander |
| 5,095,308 A | 3/1992 | Hewitt |
| 5,125,236 A | 6/1992 | Clancey et al. |
| 5,170,639 A | 12/1992 | Datta |
| 5,205,781 A | 4/1993 | Kanno |
| 5,230,719 A | 7/1993 | Berner et al. |
| 5,275,012 A | 1/1994 | Dage et al. |
| 5,307,645 A | 5/1994 | Pannell |
| 5,316,074 A | 5/1994 | Isaji et al. |
| 5,324,229 A | 6/1994 | Weisbecker |
| 5,327,997 A | 7/1994 | Nash, Jr. et al. |
| 5,333,678 A | 8/1994 | Mellum et al. |
| 5,361,593 A | 11/1994 | Dauvergne |
| 5,376,866 A | 12/1994 | Erdman |
| 5,396,779 A | 3/1995 | Voss |
| 5,402,844 A | 4/1995 | Elluin |
| 5,404,730 A | 4/1995 | Westermeyer |
| 5,426,953 A | 6/1995 | Meckler |
| 5,465,589 A | 11/1995 | Bender et al. |
| 5,497,941 A | 3/1996 | Numazawa et al. |
| 5,501,267 A | 3/1996 | Iritani et al. |
| 5,502,365 A | 3/1996 | Nanbu et al. |
| 5,524,442 A | 6/1996 | Bergmen, Jr. et al. |
| 5,528,901 A | 6/1996 | Willis |
| 5,562,538 A | 10/1996 | Suyama |
| 5,586,613 A | 12/1996 | Ehsani |
| 5,605,058 A | 2/1997 | Kurachi et al. |
| 5,641,016 A | 6/1997 | Isaji et al. |
| 5,647,534 A | 7/1997 | Kelz et al. |
| 5,657,638 A | 8/1997 | Erdman et al. |
| 5,682,757 A | 11/1997 | Peterson |
| 5,720,181 A | 2/1998 | Karl et al. |
| 5,727,396 A | 3/1998 | Boyd et al. |
| 5,752,391 A | 5/1998 | Ozaki et al. |
| 5,761,918 A | 6/1998 | Jackson et al. |
| 5,775,415 A | 7/1998 | Yoshini et al. |
| 5,782,610 A | 7/1998 | Ikeda |
| 5,819,549 A | 10/1998 | Sherwood |
| 5,896,750 A | 4/1999 | Karl |
| 5,898,995 A | 5/1999 | Ghodbane |
| 5,899,081 A | 5/1999 | Evans et al. |
| 5,901,572 A | 5/1999 | Peiffer et al. |
| 5,901,780 A | 5/1999 | Zeigler et al. |
| 5,921,092 A | 7/1999 | Behr et al. |
| 5,934,089 A | 8/1999 | Magakawa et al. |
| 5,982,643 A | 11/1999 | Phlipot |
| 5,996,363 A | 12/1999 | Kurachi et al. |
| 6,016,662 A | 1/2000 | Tanaka et al. |
| 6,021,043 A | 2/2000 | Horng |
| 6,028,406 A | 2/2000 | Birk |
| 6,029,465 A | 2/2000 | Bascobert |
| 6,038,877 A | 3/2000 | Peiffer et al. |
| 6,038,879 A | 3/2000 | Turcotte |
| 6,059,016 A | 5/2000 | Rafalovich et al. |
| 6,072,261 A | 6/2000 | Lin |
| 6,073,456 A | 6/2000 | Kawai et al. |
| 6,111,731 A | 8/2000 | Cepynsky |
| 6,112,535 A | 9/2000 | Hollenbeck |
| 6,122,929 A | 9/2000 | Yamasaki |
| 6,125,642 A | 10/2000 | Seener et al. |
| 6,134,901 A | 10/2000 | Harvest et al. |
| 6,152,217 A | 11/2000 | Ito et al. |
| 6,185,959 B1 | 2/2001 | Zajac |
| 6,193,475 B1 | 2/2001 | Rozek |
| 6,205,795 B1 | 3/2001 | Backman et al. |
| 6,205,802 B1 | 3/2001 | Drucker et al. |
| 6,209,333 B1 | 4/2001 | Bascobert |
| 6,209,622 B1 | 4/2001 | Lagace et al. |
| 6,213,867 B1 | 4/2001 | Yazici |
| 6,230,507 B1 | 5/2001 | Ban et al. |
| 6,232,687 B1 | 5/2001 | Hollenbeck et al. |
| 6,253,563 B1 | 7/2001 | Ewert et al. |
| 6,265,692 B1 | 7/2001 | Umebayahi et al. |
| 6,276,161 B1 | 8/2001 | Peiffer et al. |
| 6,282,919 B1 | 9/2001 | Rockenfeller |
| 6,318,103 B1 | 11/2001 | Rieger |

(56) References Cited

U.S. PATENT DOCUMENTS

| | | |
|---|---|---|
| 6,351,957 B2 | 3/2002 | Hara |
| 6,405,793 B1 | 6/2002 | Ghodbane et al. |
| 6,411,059 B2 | 6/2002 | Frugier et al. |
| 6,453,678 B1 | 9/2002 | Sundhar |
| 6,457,324 B2 | 10/2002 | Zeigler et al. |
| 6,467,279 B1 | 10/2002 | Backman et al. |
| 6,474,081 B1 | 11/2002 | Feuerecker |
| 6,490,876 B2 | 12/2002 | Derryberry et al. |
| 6,530,426 B1 | 3/2003 | Kishita et al. |
| 6,543,245 B1 | 4/2003 | Waldschmidt |
| 6,571,566 B1 | 6/2003 | Temple et al. |
| 6,575,228 B1 | 6/2003 | Ragland et al. |
| 6,626,003 B1 | 9/2003 | Kortüm et al. |
| 6,651,448 B2 | 11/2003 | Ross et al. |
| 6,662,592 B2 | 12/2003 | Ross et al. |
| 6,675,601 B2 | 1/2004 | Ebara |
| 6,684,863 B2 | 2/2004 | Dixon et al. |
| 6,725,134 B2 | 4/2004 | Dillen et al. |
| 6,745,585 B2 | 6/2004 | Kelm et al. |
| 6,748,750 B2 | 6/2004 | Choi |
| 6,758,049 B2 | 7/2004 | Adachi et al. |
| 6,889,762 B2 | 5/2005 | Zeigler et al. |
| 6,932,148 B1 | 8/2005 | Brummett et al. |
| 6,939,114 B2 | 9/2005 | Iwanami et al. |
| 6,965,818 B2 | 11/2005 | Koenig et al. |
| 6,981,544 B2 | 1/2006 | Iwanami et al. |
| 6,992,419 B2 | 1/2006 | Kim et al. |
| 7,131,281 B2 | 11/2006 | Salim |
| 7,135,799 B2 | 11/2006 | Rittmeyer |
| 7,150,159 B1 | 12/2006 | Brummett et al. |
| 7,246,502 B2 | 7/2007 | Hammonds et al. |
| 7,316,119 B2 | 1/2008 | Allen |
| 7,350,368 B2 | 4/2008 | Heberle et al. |
| 7,385,323 B2 | 6/2008 | Takahashi et al. |
| 7,591,143 B2 | 9/2009 | Zeigler et al. |
| 7,591,303 B2 | 9/2009 | Ziegler et al. |
| 7,614,242 B1 | 11/2009 | Quesada Saborio |
| 7,637,031 B2 | 12/2009 | Salim et al. |
| 7,765,824 B2 | 8/2010 | Wong et al. |
| 7,821,175 B2 | 10/2010 | Ionel et al. |
| 7,925,426 B2 | 4/2011 | Koebler |
| 7,932,658 B2 | 4/2011 | Ionel |
| 8,001,799 B2 | 8/2011 | Obayashi et al. |
| 8,141,377 B2 | 3/2012 | Connell |
| 8,156,754 B2 | 4/2012 | Hong et al. |
| 8,276,892 B2 | 10/2012 | Narikawa et al. |
| 8,492,948 B2 | 7/2013 | Wang et al. |
| 8,517,087 B2 | 8/2013 | Zeigler et al. |
| 8,821,092 B2 | 9/2014 | Nambara et al. |
| 8,841,813 B2 | 9/2014 | Junak et al. |
| 8,905,071 B2 | 12/2014 | Coombs et al. |
| 8,919,140 B2 * | 12/2014 | Johnson ............. B60H 1/00378 62/133 |
| 8,947,531 B2 | 2/2015 | Fischer et al. |
| 9,157,670 B2 | 10/2015 | Kreeley et al. |
| 9,216,628 B2 | 12/2015 | Self et al. |
| 9,221,409 B1 | 12/2015 | Gauthier |
| 9,327,578 B2 | 5/2016 | Itoh |
| 9,670,933 B2 | 6/2017 | Yoo et al. |
| 9,783,024 B2 | 10/2017 | Connell et al. |
| 9,878,591 B2 | 1/2018 | Taniguchi et al. |
| 10,267,546 B2 | 4/2019 | Evans et al. |
| 10,427,496 B2 | 10/2019 | Connell |
| 2001/0010261 A1 | 8/2001 | Oomura et al. |
| 2001/0013409 A1 | 8/2001 | Burk et al. |
| 2001/0015070 A1 | 8/2001 | Junichiro |
| 2002/0020183 A1 | 2/2002 | Hayashi |
| 2002/0026801 A1 | 3/2002 | Yamashita |
| 2002/0036081 A1 | 3/2002 | Ito et al. |
| 2002/0042248 A1 | 4/2002 | Vincent et al. |
| 2002/0078700 A1 | 6/2002 | Kelm et al. |
| 2002/0078705 A1 | 6/2002 | Schlosser et al. |
| 2002/0084769 A1 | 7/2002 | Iritani et al. |
| 2002/0108384 A1 | 8/2002 | Higashiyama |
| 2002/0112489 A1 | 8/2002 | Egawa et al. |
| 2002/0157412 A1 * | 10/2002 | Iwanami ............... F25B 27/00 62/236 |
| 2002/0157413 A1 | 10/2002 | Iwanami et al. |
| 2003/0041603 A1 | 3/2003 | Tada et al. |
| 2003/0105567 A1 | 6/2003 | Koenig et al. |
| 2003/0106332 A1 | 6/2003 | Okamoto |
| 2004/0060312 A1 | 4/2004 | Horn et al. |
| 2004/0079098 A1 | 4/2004 | Uno et al. |
| 2004/0112074 A1 | 6/2004 | Komura et al. |
| 2004/0168449 A1 | 9/2004 | Homan et al. |
| 2004/0216477 A1 | 11/2004 | Yamasaki et al. |
| 2004/0221599 A1 | 11/2004 | Hille et al. |
| 2004/0250560 A1 * | 12/2004 | Ikura ................... F25B 49/022 62/239 |
| 2004/0256082 A1 | 12/2004 | Bracciano |
| 2005/0016196 A1 | 1/2005 | Kadle et al. |
| 2005/0109499 A1 | 5/2005 | Iwanami et al. |
| 2005/0161211 A1 | 7/2005 | Zeigler et al. |
| 2005/0230096 A1 | 10/2005 | Yamaoka |
| 2005/0235660 A1 | 10/2005 | Pham |
| 2005/0257545 A1 | 11/2005 | Ziehr et al. |
| 2006/0042284 A1 | 3/2006 | Heberle et al. |
| 2006/0080980 A1 | 4/2006 | Lee et al. |
| 2006/0102333 A1 | 5/2006 | Zeigler et al. |
| 2006/0118290 A1 | 6/2006 | Klassen et al. |
| 2006/0151163 A1 | 7/2006 | Zeigler et al. |
| 2006/0151164 A1 | 7/2006 | Zeigler et al. |
| 2006/0254309 A1 | 11/2006 | Takeuchi et al. |
| 2006/0277936 A1 | 12/2006 | Norden et al. |
| 2007/0039336 A1 | 2/2007 | Wu et al. |
| 2007/0070605 A1 | 3/2007 | Straznicky et al. |
| 2007/0101760 A1 | 5/2007 | Bergander |
| 2007/0103014 A1 | 5/2007 | Sumiya et al. |
| 2007/0117167 A1 | 5/2007 | Malinowski |
| 2007/0131408 A1 | 6/2007 | Zeigler et al. |
| 2007/0144723 A1 | 6/2007 | Aubertin et al. |
| 2007/0144728 A1 | 6/2007 | Kinmartin et al. |
| 2007/0163276 A1 | 7/2007 | Braun et al. |
| 2007/0227167 A1 | 10/2007 | Shapiro |
| 2007/0251256 A1 | 11/2007 | Pham et al. |
| 2007/0295017 A1 | 12/2007 | Pannell |
| 2008/0017347 A1 | 1/2008 | Chung et al. |
| 2008/0110185 A1 | 5/2008 | Veettil et al. |
| 2008/0156887 A1 | 7/2008 | Stanimirovic |
| 2008/0196436 A1 | 8/2008 | Connell |
| 2008/0196877 A1 | 8/2008 | Zeigler et al. |
| 2008/0209924 A1 | 9/2008 | Yoon et al. |
| 2008/0295535 A1 | 12/2008 | Robinet et al. |
| 2009/0140590 A1 | 6/2009 | Hung |
| 2009/0211280 A1 | 8/2009 | Alston |
| 2009/0229288 A1 | 9/2009 | Alston et al. |
| 2009/0241592 A1 | 10/2009 | Stover |
| 2009/0249802 A1 | 10/2009 | Nemesh et al. |
| 2009/0301702 A1 | 12/2009 | Zeigler et al. |
| 2010/0009620 A1 | 1/2010 | Kawato et al. |
| 2010/0019047 A1 | 1/2010 | Flick |
| 2010/0127591 A1 | 5/2010 | Court et al. |
| 2010/0186433 A1 | 7/2010 | Galante et al. |
| 2010/0218530 A1 | 9/2010 | Melbostad et al. |
| 2010/0263395 A1 | 10/2010 | Adachi et al. |
| 2010/0281901 A1 | 11/2010 | Kawase et al. |
| 2010/0293966 A1 | 11/2010 | Yokomachi |
| 2010/0297517 A1 | 11/2010 | Maier |
| 2011/0000240 A1 | 1/2011 | Yamada et al. |
| 2011/0088417 A1 | 4/2011 | Kayser |
| 2011/0120146 A1 | 5/2011 | Ota et al. |
| 2011/0126566 A1 | 6/2011 | Jones et al. |
| 2011/0174014 A1 | 7/2011 | Scarcella et al. |
| 2011/0308265 A1 | 12/2011 | Phannavong |
| 2012/0023982 A1 | 2/2012 | Berson et al. |
| 2012/0047930 A1 | 3/2012 | Uselton |
| 2012/0102779 A1 | 5/2012 | Beers et al. |
| 2012/0118532 A1 | 5/2012 | Jentzsch et al. |
| 2012/0133176 A1 | 5/2012 | Ramberg |
| 2012/0247135 A1 | 10/2012 | Fakieh |
| 2012/0297805 A1 | 11/2012 | Kamada et al. |
| 2012/0318014 A1 | 12/2012 | Huff et al. |
| 2013/0040549 A1 | 2/2013 | Douglas et al. |
| 2013/0091867 A1 | 4/2013 | Campbell et al. |

(56) References Cited

U.S. PATENT DOCUMENTS

| | | |
|---|---|---|
| 2013/0145781 A1 | 6/2013 | Liu |
| 2013/0167577 A1 | 7/2013 | Street |
| 2013/0181556 A1 | 7/2013 | Li et al. |
| 2013/0195678 A1 | 8/2013 | Yoo |
| 2013/0298583 A1 | 11/2013 | O'Donnell et al. |
| 2013/0319630 A1 | 12/2013 | Yamamoto |
| 2014/0066572 A1 | 3/2014 | Corveleyn |
| 2014/0075970 A1 | 3/2014 | Benson |
| 2014/0075973 A1 | 3/2014 | Graaf et al. |
| 2014/0102679 A1 | 4/2014 | Matsudaira et al. |
| 2014/0223939 A1 | 8/2014 | Nasuta et al. |
| 2014/0241926 A1 | 8/2014 | Fraser |
| 2014/0245770 A1 | 9/2014 | Chen et al. |
| 2014/0260358 A1 | 9/2014 | Leete et al. |
| 2014/0260403 A1 | 9/2014 | Connell |
| 2014/0290299 A1 | 10/2014 | Nakaya |
| 2014/0291411 A1 | 10/2014 | Tamaki et al. |
| 2015/0059367 A1 | 3/2015 | Emo et al. |
| 2015/0064639 A1 | 3/2015 | Drumbreck |
| 2015/0158368 A1 | 6/2015 | Herr-Rathke et al. |
| 2015/0202986 A1 | 7/2015 | Hatakeyama et al. |
| 2015/0210287 A1 | 7/2015 | Penilla et al. |
| 2015/0236525 A1 | 8/2015 | Aridome |
| 2015/0239365 A1 | 8/2015 | Hyde et al. |
| 2015/0306937 A1 | 10/2015 | Kitamura et al. |
| 2015/0330675 A1 | 11/2015 | Tamaki et al. |
| 2016/0089958 A1 | 3/2016 | Powell |
| 2016/0144685 A1 | 5/2016 | Ochiai et al. |
| 2016/0146554 A1 | 5/2016 | Bhatia et al. |
| 2016/0159199 A1 | 6/2016 | Kuroda et al. |
| 2016/0229266 A1 | 8/2016 | Maeda et al. |
| 2017/0067676 A1 | 3/2017 | Munk et al. |
| 2017/0211829 A1 | 7/2017 | Slack et al. |
| 2017/0211855 A1 | 7/2017 | Fraser et al. |
| 2017/0350632 A1 | 12/2017 | Hirao |
| 2018/0001731 A1 | 1/2018 | Vehr et al. |

FOREIGN PATENT DOCUMENTS

| | | |
|---|---|---|
| CN | 201872573 U | 6/2011 |
| CN | 102196931 A | 9/2011 |
| CN | 102398496 A | 4/2012 |
| CN | 103547466 A | 1/2014 |
| CN | 104105610 A | 10/2014 |
| CN | 105071563 A | 11/2015 |
| CN | 105186726 A | 11/2015 |
| CN | 205177980 U | 4/2016 |
| CN | 205194809 U | 4/2016 |
| CN | 105576321 A | 5/2016 |
| CN | 105960345 A | 9/2016 |
| CN | 106103165 A | 11/2016 |
| CN | 106898841 A | 6/2017 |
| DE | 4440044 A1 | 5/1996 |
| DE | 197 45 028 A1 | 4/1999 |
| DE | 199 17 811 A1 | 3/2000 |
| DE | 10014483 A1 | 11/2000 |
| DE | 199 42 029 A | 3/2001 |
| DE | 199 54 308 A1 | 7/2001 |
| DE | 102005004950 A1 | 8/2006 |
| DE | 10 2007 028851 A1 | 12/2008 |
| DE | 102010054965 A1 | 6/2012 |
| DE | 10 2012 022564 A1 | 5/2014 |
| DE | 11 2015 000552 | 11/2016 |
| EP | 0516413 A1 | 12/1992 |
| EP | 0958952 A1 | 11/1999 |
| EP | 1024038 A2 | 8/2000 |
| EP | 1 400 764 A1 | 3/2004 |
| EP | 1 477 748 A1 | 11/2004 |
| EP | 1 700 725 A1 | 9/2006 |
| EP | 1 703 231 A1 | 9/2006 |
| EP | 1 970 651 A1 | 9/2008 |
| EP | 2048011 A1 | 4/2009 |
| EP | 2196748 A2 | 6/2010 |
| EP | 2320160 A1 | 11/2011 |
| EP | 2620723 A2 | 7/2013 |
| EP | 2894420 A1 | 7/2015 |
| EP | 0963895 A2 | 12/2015 |
| EP | 3118035 A1 | 1/2017 |
| FR | 2966391 A1 | 4/2012 |
| JP | H02-128915 A | 5/1990 |
| JP | 5032121 A | 2/1993 |
| JP | H07186711 A | 7/1995 |
| JP | H97-76740 A | 3/1997 |
| JP | H09318177 A | 12/1997 |
| JP | H10281595 A | 10/1998 |
| JP | 2000108651 A | 4/2000 |
| JP | 2005044551 A | 4/2000 |
| JP | 2002081823 A | 3/2002 |
| JP | 2005-033941 A | 2/2005 |
| JP | 2005-081960 A | 3/2005 |
| JP | 2006-264568 A | 10/2006 |
| JP | 2008220043 A | 9/2008 |
| JP | 2012017029 A | 1/2012 |
| JP | 2014226979 A | 12/2014 |
| KR | 20090068136 A | 6/2009 |
| WO | WO 89/09143 A1 | 10/1989 |
| WO | WO 99/61269 | 12/1999 |
| WO | WO 00/00361 | 1/2000 |
| WO | WO 2004/011288 A1 | 2/2004 |
| WO | WO 2006/082082 A1 | 8/2006 |
| WO | WO 2012/158326 A1 | 11/2012 |
| WO | WO 2013/113308 A1 | 8/2013 |
| WO | WO 2014/112320 A1 | 7/2014 |
| WO | WO 2014/180749 A1 | 11/2014 |
| WO | WO 2014/209780 A1 | 12/2014 |
| WO | WO 2015/076872 A1 | 5/2015 |

OTHER PUBLICATIONS

Anonymous: "Nite Connected Climate Controlled Transport Monitoring/Mobile Internet of Things UI Design/Mobil UI: Progress/Printeres/Internet of Things, User Inter . . . ," Oct. 19, 2016 retrieved from: URL:https://za.pinterest.com/pin/192810427773981541/, 1 pg.
Bergstrom, Inc., International Search Report and Written Opinion, PCT/US2017049859, Nov. 12, 2017, 4 pgs.
Bergstrom, Inc., International Preliminary Report on Patentability, PCT/US2017049859, Mar. 5, 2019, 6 pgs.
Bergstrom, Inc., International Search Report and Written Opinion PCT/US2017053196, Sep. 3, 2018, 17 pgs.
Bergstrom, Inc., International Preliminary Report on Patentability, PCT/US2017053196, Apr. 2, 2019, 11 pgs.
Bergstrom, Inc., International Search Report and Written Opinion PCT/US2016/423326, Sep. 27, 2016, 8 pgs.
Bergstrom, Inc., International Preliminary Report on Patentability PCT/US2016/423326, Jan. 16, 2018, 7 pgs.
Bergstrom, Inc., International Search Report and Written Opinion PCT/US2016/42307, Oct. 7, 2016, 8 pgs.
Bergstrom, Inc., International Preliminary Report on Patentability PCT/US2016/42307, Jan. 16, 2018, 7 pgs.
Bergstrom, Inc., International Search Report and Written Opinion PCT/US2016/42314, Sep. 30, 2016, 7 pgs.
Bergstrom, Inc., International Preliminary Report on Patentability, PCT/US2016/42314, Jan. 16, 2018, 6 pgs.
Bergstrom, Inc., International Search Report and Written Opinion PCT/US2016/42329, Sep. 30, 2016, 6 pgs.
Bergstrom, Inc., International Preliminary Report on Patentability PCT/US2016/42329, Jan. 16, 2018, 5 pgs.
Bergstrom, Inc., Communication Pursuant to Article 94(3), EP16820096.2, Aug. 12, 2019, 7 pgs.
Bergstrom, Inc., Communication Pursuant to Rules 161(1) and 162, EP17780954.8, May 10, 2019, 3 pgs.
Bergstrom, Inc., Extended European Search Report, EP19166779.9, Aug. 30, 2019, 8 pgs.
Bergstrom, Inc. Communication Pursuant to Article 94(3), EP14722438.0, Jan. 24, 2018, 5 pgs.
Bergstrom, Inc. Corrected Extended European Search Report, EP16204259.2, Nov. 24, 2017, 15 pgs.
Bergstrom, Inc. Extended European Search Report, EP16204254.3, Jul. 25, 2017, 8 pgs.

(56) References Cited

OTHER PUBLICATIONS

Bergstrom, Inc. Extended European Search Report, EP16204256.8, Dec. 1, 2017, 13 pgs.
Bergstrom, Inc. Extended European Search Report, EP16204256.8, Jan. 12, 2018, 11 pgs.
Bergstrom, Inc. Extended European Search Report, EP16204259.2, Oct. 25, 2017, 15 pgs.
Bergstrom, Inc. Extended European Search Report, EP16204267.5, Jul. 11, 2017, 8 pgs.
Bergstrom, Inc. Extended European Search Report, EP18177850.7, Nov. 28, 2018. 8 pgs.
Bergstrom, Inc. Partial European Search Report, EP16204256.8, Jul. 13, 2017, 14 pgs.
Bergstrom, Inc. Partial European Search Report, EP16204259.2, May 30, 2017, 14 pgs.
Bergstrom, Inc., 2nd Office Action, CN201380081940.1, Jan. 17, 2018, 13 pgs.
Bergstrom, Inc., 3rd Office Action, CN201380081940.1, Jul. 30, 2018, 7 pgs.
Bergstrom, Inc., 2nd Office Action, CN201480027137.4, Jul. 13, 2017, 10 pgs.
Bergstrom, Inc., 3rd Office Action, CN201480027137.4, Jan. 17, 2018, 19 pgs.
Bergstrom, Inc., 4th Office Action, CN201480027137.4, Jul. 26, 2018, 8 pgs.
Bergstrom, Inc., Patent Certificate CN201480027137.4, May 31, 2019, 4 pgs.
Bergstrom, Inc., 1st Office Action, CN201680002224.3, Dec. 11, 2018, 5 pgs.
Bergstrom, Inc., Letters Patent, CN201680002224.3, Sep. 10, 2019, 2 pgs.
Bergstrom, Inc., Communication Pursuant to Article 94(3), EP14717604.4, Jun. 2, 2017, 12 pgs.
Bergstrom, Inc., Communication Pursuant to Article 94(3), EP14717604.4, Feb. 4, 2019, 5 pgs.
Bergstrom, Inc., Communication Pursuant to Rules 161(2) and 162 EPC, EP13795064.8, Jun. 22, 2016, 2 pgs.
Bergstrom, Inc., Communication Pursuant to Rules 161(2) and 162 EPC, EP14717604.4, Oct. 23, 2015, 2 pgs.
Bergstrom, Inc., Communication Pursuant to Rules 161(2) and 162 EPC, EP14722438.0, Nov. 2, 2015. 2 pgs.
Bergstrom, Inc., Communication Pursuant to Article 94(3), EP16820096.2, Jan. 18, 2022, 5 pgs.
Bergstrom, Inc., International Preliminary Report on Patentability, PCT/US2013/068331, May 10, 2016, 6 pgs.
Bergstrom, Inc., International Preliminary Report on Patentability, PCT/US2014/026683, Sep. 15, 2015, 6 pgs.
Bergstrom, Inc., International Preliminary Report on Patentability, PCT/US2014/026687, 7 pgs.
Bergstrom, Inc., International Preliminary Report on Patentability, PCT/US2016/021602, Sep. 17, 2017, 11 pgs.
Bergstrom, Inc., International Preliminary Report on Patentability, PCT/US2016/065812, Jun. 12, 2018, 8 pgs.
Bergstrom, Inc., International Search Report and Written Opinion, PCT/US2013/068331, Nov. 7, 2014, 9 pgs.
Bergstrom, Inc., International Search Report and Written Opinion, PCT/US2014/026683, Jul. 3, 2014 12 pgs.
Bergstrom, Inc., International Search Report and Written Opinion, PCT/US2014/026687, Jul. 28, 2014, 12 pgs.
Bergstrom, Inc., International Search Report and Written Opinion, PCT/US2016/021602, Nov. 3, 2016, 7 pgs.
Bergstrom, Inc., International Search Report and Written Opinion, PCT/US2016/065812, Mar. 22, 2017, 12 pgs.
Bergstrom, Inc., International Search Report and Written Opinion, PCT/US2017/021346, Jul. 25, 2017, 11 pgs.
Bergstrom, Inc., International Search Report and Written Opinion, PCT/US2018/044093, Oct. 25, 2018, 13 pgs.
Bergstrom, Inc., Office Action, CN201480027117.7, received Mar. 9, 2017, 8 pgs.
Bergstrom, Inc., Office Action, CN201480027137.4, received Mar. 3, 2017, 15 pgs.
Bergstrom, Inc., Patent Certificate, CN201480027117.7, Nov. 21, 2017, 3 pgs.
Connell, Final Office Action, U.S. Appl. No. 14/209,877, Jun. 22, 2016, 17 pgs.
Connell, Final Office Action, U.S. Appl. No. 14/209,877, Dec. 29, 2016, 21 pgs.
Connell, Final Office Action, U.S. Appl. No. 14/209,961, Jul. 25, 2016, 15 pgs.
Connell, Notice of Allowance, Sep. 26, 2019, U.S. Appl. No. 15/816,993, 8 pgs.
Connell, Final Office Action, U.S. Appl. No. 15/064,552, Jun. 1, 2017, 9 pgs.
Connell, Office Action, U.S. Appl. No. 15/660,734, Oct. 30, 2019, 24 pgs.
Connell, Final Office Action, U.S. Appl. No. 15/065,745, Dec. 17, 2018, 27 pgs.
Connell, Notice of Allowance, U.S. Appl. No. 15/065,745, Nov. 14, 2019, 9 pgs.
Connell, Notice of Allowance, May 20, 2019, U.S. Appl. No. 15/722,860, 5 pgs.
Connell, Notice of Allowance, U.S. Appl. No. 14/209,877, Aug. 4, 2017, 7 pgs.
Connell, Notice of Allowance, U.S. Appl. No. 14/209,877, May 16, 2017, 5 pgs.
Connell, Notice of Allowance, U.S. Appl. No. 14/209,961, Jun. 15, 2017, 10 pgs.
Connell, Notice of Allowance, U.S. Appl. No. 14/965,142, Deb. 26, 2018, 8 pgs.
Connell, Notice of Allowance, U.S. Appl. No. 14/995,119, Aug. 31, 2017, 7 pgs.
Connell, Notice of Allowance, U.S. Appl. No. 15/280,876, Jun. 21, 2018, 8 pgs.
Connell, Office Action, U.S. Appl. No. 15/439,865, Sep. 24, 2019, 6 pgs.
Connell, Notice of Allowance, U.S. Appl. No. 15/791,243, Jan. 24, 2019, 7 pgs.
Connell, Office Action, Oct. 19, 2018, U.S. Appl. No. 15/722,860, 7 pgs.
Connell, Office Action, U.S. Appl. No. 15/283,150, Sep. 27, 2018, 21pgs.
Connell, Notice of Allowance, U.S. Appl. No. 15/283,150, Mar. 22, 2019, 8 pgs.
Connell, Office Action, U.S. Appl. No. 14/209,877, Nov. 27, 2015, 19 pgs.
Connell, Office Action, U.S. Appl. No. 14/209,961, Dec. 2, 2015, 14 pgs.
Connell, Office Action, U.S. Appl. No. 14/965,142, Aug. 29, 2017, 12 pgs.
Connell, Office Action, U.S. Appl. No. 15/065,745, May 31, 2018, 44 pgs.
Connell, Office Action, U.S. Appl. No. 15/280,876, Dec. 14, 2017, 23 pgs.
Connell, Office Action, U.S. Appl. No. 15/791,243, May 8, 2018, 12 pgs.
Connell, Office Action, U.S. Appl. No. 16/894,728, May 26, 2021, 7 pgs.
Connell, Notice of Allowance, U.S. Appl. No. 16/894,728, Sep. 22, 2021, 8 pgs.
Connell, Notice of Allowance, U.S. Appl. No. 16/546,141, Dec. 2, 2020, 5 pgs.
Connell, Notice of Allowance, U.S. Appl. No. 15/439,865, Jan. 30, 2020, 8 pgs.
Connell, Notice of Allowance, U.S. Appl. No. 15/660,734, Mar. 9, 2020, 8 pgs.
Connell, Notice of Allowance, U.S. Appl. No. 16/133,599, Mar. 3, 2020, 9 pgs.
Connell, Office Action, U.S. Appl. No. 16/941,495, Feb. 1, 2022, 12 pgs.
Connell, Notice of Allowance, U.S. Appl. No. 16/941,495, Jul. 5, 2022, 8 pgs.

(56) References Cited

OTHER PUBLICATIONS

Connell, Office Action, U.S. Appl. No. 17/560,216, Nov. 21, 2022, 10 pgs.
Connell, Notice of Allowance, U.S. Appl. No. 17/560,216, Mar. 9, 2023, 8 pgs.
Connell, Office Action, U.S. Appl. No. 17/224,052, Feb. 6, 2023, 8 pgs.
Connell, Notice of Allowance, U.S. Appl. No. 16/922,855, Jun. 20, 2022, 8 pgs.
Connell, Notice of Allowance, U.S. Appl. No. 17/224,052 Jun. 2, 2023, 5 pgs.
Connell, Office Action, U.S. Appl. No. 18/071,517, Jul. 7, 2023, 18 pgs.
FlatPlate Heat Exchangers; GEA FlatPiate Inc.; website—http://www.flatplate.com/profile.html; date last visited Aug. 9, 2007; 3 pages.
Frank Stodolsky, Linda Gaines, and Anant Vyas; Analysis of Technology Options to Reduce the Fuel Consumption of Idling Trucks; Paper-Center for Transportation Research, Energy Systems Division, Argonne National Laboratory,9700 South Cass Avenue, Argonne, Illinois 60439;Jun. 2000; 30 pages.
Glacier Bay Inc., Company History, pages printed from a website, http://web.archive.org/web/20000301153828/www.glacierbay.corn/History:.htrn, apparent archive date: Mar. 1, 2000; 2 pages.
Glacier Bay Inc., Contact, page printed from a website, httQ://web.archive.org/web/19990508104511/W'''I!V.qlacierba:t.com/Contact.htm, apparent archive date: May 8, 1999; 1 page.
Glacier Bay Inc., Darpa/Glacier Bay ECS, pages printed from a website, httir//web.archive.org/web/19991104132941/wvvw.glacierbay.com/darQatxt.htm, apparent archive date: Nov. 4, 1999, 2 pages.
Glacier Bay Inc., Glacier Bay ECS DARPA Project—Final Report, pages printed from a website, http://web.archive.or_gjweb/19991103001512/v•vww,_g.Jacierbay.com/Darnhtm.htm, apparent archive date: Nov. 3, 1999, 9 pages.
Glacier Bay Inc., Glacier Bay ECS DARPA Project—Operational Video, page printed from a website, httQ://web.archive.org/web/19991022221040/wvvw.qlacierbay.com/DarQvid.htm, apparent archive date Oct. 22, 1999; 1 page.
Glacier Bay Inc., Glacier Bay ECS DARPA Project—Project Photos, pages printed from a website, http://web.archive.org/web/1999''1103012854/www.glacierbay.com/Dargghotos.htm, apparent archive date: Nov. 3, 1999, 2 pages.
Glacier Bay Inc., Glacier Bay's Home Page, page printed from a website, htt(?:i/web.archive.org/web/19990417062255/htt[2://www.glacierbay.com/, apparent archive date: Apr. 17, 1999, 1 page.
Glacier Bay Inc., R & D, pages printed from a website, htt://web.archive.org/web/20000121130306/www.glacierbay.com/R&D.htm, apparent archive date: Jan. 21, 2000, 2 pages.
Hansson, Office Action Oct. 5, 2018, U.S. Appl. No. 15/256,109, 14 pgs.
Hansson, Final Office Action, U.S. Appl. No. 15/256,109, May 2, 2019, 14 pgs.
Hansson, Notice of Allowance, U.S. Appl. No. 15/256,109, Sep. 24, 2019, 9 pgs.
Mahmoud Ghodbane; On Vehicle Performance of a Secondary Loop A/C System; SAE Technical Paper Series 2000-01-1270; SAE 2000 World Congress, Detroit, Michigan; Mar. 6-9, 2000; 6 pages.
Masami Konaka and Hiroki Matsuo; SAE Technical Paper Series 2000-01-1271; SAE 2000 World Congress, Detroit, Michigan; Mar. 6-9, 2000; 6 pages.
Mayo Mayo, Final Office Action, U.S. Appl. No. 15/034,517, Aug. 28, 2018, 9pgs.
Mayo Mayo, Final Office Action, U.S. Appl. No. 15/034,517, Nov. 30, 2018, 7 pgs.
Mayo Mayo, Office Action, U.S. Appl. No. 15/034,517, Feb. 21, 2018, 22 pgs.
Michael Löhle, Günther Feuerecker and Ulrich Salzer; Non Idling HVAC-modufe tor Long Distance Trucks;SAE TechnicalPaper Series 1999-01-1193; International Congress and Exposition, Detroit, Michigan; Mar. 1-4, 1999; 8 pages.
Packless Industries, the leader in refrigerant to water coaxial heat exchangers, flexible hoses and sucti . . . ; website—http://www.packless.com/profile.htmle: date last visited Aug. 9, 2007; 1 page. Paper No. 26 in IPR2012-00027, Jun. 11, 2013, 12 pgs. (U.S. Pat. No. 7,591,303).
Patricia Gardie and Vincent Goetz; Thermal Energy Storage System by Solid Absorption for Electric Automobile Heating and Air-Conditioning; Paper; 5 pages.
TropiCool No-idle Heating & Cooling, 110V/12V High-efficiency, Self-contained, Electrified Heating/AC System; ACC Climate Control Brochure, Elkhart, Indiana; 205, 1 page.
TropiCool Power Plus, More comfort. More efficiency. More options.; ACC Climate Control Brochure, Elkhart, Indiana; 2006, 3 pages.
TYCO Electronics Corporation, "MAG-MATE Connector with Multispring Pin," Datasheet, 2013, pp. 1-2 from <URL: http://datasheet.octopart.com/1247003-2-TE-Connectivity-datasheet-14918754.pdf>.
Xi, Office Action, U.S. Appl. No. 16/370,741, Jun. 29, 2021, 17 pgs.
Xi, Final Office Action, U.S. Appl. No. 16/370,741, Dec. 1, 2021, 7 pgs.
Xi, Notice of Allowance, U.S. Appl. No. 16/370,741, Apr. 18, 2022, 8 pgs.
Xei, Office Action, U.S. Appl. No. 17/894,106, Jun. 23, 2023, 10 pgs.
Xei, Office Action, U.S. Appl. No. 17/894,106, Nov. 8, 2023, 7 pgs.
Zeigler, Office Action, U.S. Appl. No. 13/661,519, Mar. 11, 2013, 8 pgs.
Zeigler, Final Office Action, U.S. Appl. No. 13/661,519, Sep. 18, 2013, 15 pgs.
Zeigler, Office Action, U.S. Appl. No. 13/661,519, Apr. 9, 2014, 20 pgs.
Zeigler, Final Office Action, U.S. Appl. No. 13/661,519, Sep. 26, 2014, 23 pgs.
Zeigler, Office Action, U.S. Appl. No. 13/661,519, Oct. 28, 2015, 20 pgs.
Zeigler, Notice of Allowance, U.S. Appl. No. 13/661,519, Jun. 17, 2016, 8 pgs.
Zeigler, Office Action, U.S. Appl. No. 16/046,711, Feb. 6, 2020, 17 pgs.
Zeigler, Final Office Action, U.S. Appl. No. 16/046,711, Jul. 23, 2020, 17 pgs.
Zeigler, Advisory Action, U.S. Appl. No. 16/046,711, Oct. 27, 2020, 5 pgs.
Zeigler, Office Action, U.S. Appl. No. 16/046,711, Aug. 31, 2021, 16 pgs.
Zeigler, Office Action, U.S. Appl. No. 17/948,999, May 1, 2023, 24 pgs.
Zeigler, Notice of Allowance, U.S. Appl. No. 17/948,999, Dec. 22, 2023, 6 pgs.
Bergstrom, Inc., Communication Pursuant to Article 94(3), EP17780954.8, Jul. 30, 2020, 6 pgs.
Bergstrom, Inc., Notification of Grant, CN201480027137.4, Feb. 21, 2019, 1 pg.
Connell, Office Action, U.S. Appl. No. 15/065,745, May 9, 2019, 28 pgs.
Connell, Notice of Allowance, Feb. 7, 2019, U.S. Appl. No. 15/722,860, 5 pgs.
Connell, Notice of Allowance, U.S. Appl. No. 15/791,243, May 15, 2019, 7 pgs.
Connell, Office Action, Apr. 18, 2019, U.S. Appl. No. 15/816,993, 17 pgs.
Bergstrom, Inc., Communication Pursuant to Article 94(3), EP17768567.4, Jul. 14, 2022, 5 pgs.
Connell, Office Action, U.S. Appl. No. 18/071,517, Aug. 26, 2024, 16 pgs.
Connell, Final Office Action, U.S. Appl. No. 18/475,062, Sep. 5, 2024, 5 pgs.
Bergstrom, Inc., Communication Pursuant to Article 94(3), EP13795064.8, Oct. 8, 2018, 5 pgs.
Bergstrom, Inc., Communication Pursuant to Article 94(3), EP18177850.7, Jan. 30, 2023, 4 pgs.
Bergstrom, Inc., Communication Pursuant to Article 94(3), EP17780954.8, Mar. 27 2024, 8 pgs.

(56) References Cited

OTHER PUBLICATIONS

Bergstrom, Inc., First Office Action, CN201880062566.3, Feb. 9, 2021, 15 pgs.
Bergstrom, Inc., Second Office Action, CN201880062566.3, Oct. 19, 2021, 13 pgs.
Beygel, Notice of Allowance, U.S. Appl. No. 17/972,932, Jul. 31, 2024, 9 pgs.
Connell, Office Action, U.S. Appl. No. 18/475,062, Apr. 18, 2024, 7 pgs.
Zeigler, Notice of Allowance, U.S. Appl. No. 17/948,999, Apr. 25, 2024, 5 pgs.

* cited by examiner

302

SYSTEMS AND METHODS FOR CONTROLLING A VEHICLE HVAC SYSTEM

RELATED APPLICATIONS

This application is a continuation of U.S. patent application Ser. No. 17/560,216, filed Dec. 22, 2021, entitled "Systems and Methods For Controlling A Vehicle HVAC System," which is a continuation of U.S. patent application Ser. No. 16/894,728, filed Jun. 5, 2020 (now U.S. Pat. No. 11,241,939), entitled "Systems and Methods For Controlling A Vehicle HVAC System," which is a continuation of U.S. patent application Ser. No. 15/439,865, filed Feb. 22, 2017 (now U.S. Pat. No. 10,675,948), entitled "Systems and Methods for Controlling a Vehicle HVAC System," which claims priority to U.S. Provisional Application No. 62/401,756, filed Sep. 29, 2016, entitled "Systems and Methods for Controlling a Vehicle HVAC System," and U.S. Provisional Application No. 62/454,281, filed Feb. 3, 2017, entitled "Systems and Methods for Controlling a Vehicle HVAC System," all of which are hereby expressly incorporated by reference in their entirety.

TECHNICAL FIELD

This generally relates to heating, ventilating, and air conditioning (HVAC) systems for vehicles and methods for controlling such systems, including but not limited to, HVAC systems and methods for utilizing dual compressors.

BACKGROUND

Recent global economic expansion has stressed the transportation industry's ability to keep up with shipping demands for materials and products. Drivers' time spent on the road, and in the vehicles, has increased in an attempt to meet the high market demands. In addition, drivers in the industry take breaks along their routes to combat fatigue, or to comply with various regulations. Thus, the number of trucks pulled over at toll plazas, weight stations, rest stops, and the like has also increased in recent years. Significantly, these locations often do not provide facilities for the drivers to use to sleep or rest, necessitating continued occupancy within the vehicle.

In some circumstances heat conditions can present issues for the drivers ranging from discomfort to health risks, such as heat stroke. Thus it is important that the drivers have access to functioning vehicular climate systems at all times, including at rest stops.

Such a climate system needs to provide a comfortable environment for drivers and passengers when the engine of the vehicle is on as well as when it is off. Maximizing the efficiency of such systems, however, is challenging.

SUMMARY

Accordingly, there is a need for systems and/or devices with more efficient and accurate methods for providing a comfortable environment within a vehicle. In some instances, such systems, devices, and methods manage an engine-driven compressor and an electrically-driven compressor so as to maximize efficiency. Such systems, devices, and methods optionally complement or replace conventional systems, devices, and methods for providing a comfortable environment within the vehicle.

In some embodiments, a climate system is provided that includes a primary air conditioning system having a first compressor, a second compressor, and a controller electrically coupled to the first compressor (also sometimes called the primary compressor) and the second compressor (also sometimes called the auxiliary compressor). The primary air conditioning system further includes: a temperature sensor configured to measure a temperature within the compartment of the vehicle; and a user interface configured to receive a desired temperature of the compartment from a user. The second compressor is coupled with primary air conditioning system, and driven by an electric motor to compress a refrigerant. The controller is configured to obtain the desired temperature of the compartment from the input mechanism, receive the measured temperature of the compartment from the sensor, and calculate a thermal load of the compartment based at least partially on a difference between the desired temperature and the measured temperature. Upon determining that the thermal load exceeds a first predetermined thermal load threshold, the controller automatically, without human intervention, turns-on the engine if the engine is off; activates the first compressor, if the first compressor is off, to compress the refrigerant for cooling the compartment; and activates the second compressor, if the second compressor is off, to compress the refrigerant for cooling the compartment. Upon determining that the thermal load does not exceed the first predetermined thermal load threshold but does exceed a second thermal load threshold, the controller automatically, without human intervention, turns-on the engine if the engine is off; and activates the first compressor, if the first compressor is off, to compress the refrigerant for cooling the compartment. Upon determining that the thermal load does not exceed the second predetermined thermal load threshold, the controller deactivates the first compressor if the first compressor is on; and activate the second compressors, if the second compressor is off, to compress the refrigerant for cooling the compartment.

In some embodiments, the electric motor is powered by a battery that is charged by the engine during operation of the engine, by a solar panel installed on the vehicle, or by an external source of electrical power.

In some embodiments, the second compressor is fluidly coupled in parallel with the first compressor and fluidly coupled in series with a first condenser and a first evaporator of the primary air conditioning system.

In some embodiments, the climate system further includes a second condenser disposed downstream of the second compressor and fluidly coupled to the second compressor to condense the refrigerant compressed by the second compressor. The second compressor and the second condenser form an auxiliary unit fluidly coupled in parallel with the first compressor and fluidly coupled in series with a first condenser and a first evaporator of the primary air conditioning system. In some embodiments, the second compressor and the second condenser are integrated to form one single unit. In some embodiments, the auxiliary unit also includes a first air blower electrically coupled to the controller, positioned proximate the second condenser and configured to blow ambient air or air from an air intake of the engine over the second condenser. In such embodiments, the controller automatically activates the first air blower to blow the ambient air or the air from the air intake of the engine over the second condenser when the second compressor is activated.

In some embodiments, the controller is wirelessly coupled to a mobile remote control capable of selectively activating or deactivating the controller from inside and outside of the vehicle. In some embodiments, the remote control is embedded in a vehicle key or a mobile phone. In some embodiments, the controller is automatically activated when the remote control is moving towards the vehicle and passing a first predetermined periphery. The controller is automatically deactivated when the remote control is moving away from the vehicle and passing a second predetermined periphery.

In some embodiments, the climate system also includes an object sensor configured to sense presence or absence of an object in the vehicle.

In some embodiments, the primary air conditioning system includes a heat exchanger thermally coupled with the compartment of the vehicle; and a coolant pump connected to an engine coolant line for circulating a heated engine coolant from the engine to the heat exchanger to heat the compartment of the vehicle. In such embodiments, the controller automatically activates the coolant pump to direct the heated engine coolant from the engine to the heat exchanger to heat the compartment of the vehicle, if the temperature in the compartment is below the desired temperature and if the engine is turned on.

In other embodiments, the present disclosure provides a method for controlling a climate system installed in a vehicle for heating and cooling a compartment of the vehicle. The climate system includes an engine driven air conditioning system, an electrically driven unit and a controller for performing the method. The engine driven air conditioning system includes an engine driven compressor, a condenser, and an evaporator thermally coupled to the compartment of the vehicle to cool the compartment. The electrically driven unit includes an electrically driven compressor fluidly coupled in parallel with the engine driven compressor and disposed in series with the condenser and the evaporator. The method includes: (A) obtaining a temperature in the compartment; (B) determining whether the temperature in the compartment is within a desired temperature range; (C) if the temperature in the compartment is above the desired temperature range, calculating a thermal load of the compartment based at least partially on the desired temperature range and the measured temperature, and determining whether the thermal load exceeds first and second predetermined thermal load thresholds; (D) if the thermal load exceeds the first predetermined thermal load threshold: turning on the engine if the engine is off; activating the engine driven compressor, if the engine driven compressor is off, to compress the refrigerant for cooling the compartment; and activating the electrically driven compressor, if the electrically driven compressor is off, to compress the refrigerant for cooling the compartment; (E) if the thermal load does not exceed the first predetermined thermal load threshold but does exceed a second predetermined thermal load threshold: turning on the engine if the engine is off; and activating the engine driven compressor, if the engine driven compressor is off, to compress the refrigerant for cooling the compartment; and (F) if the thermal load does not exceed the second predetermined thermal load threshold: deactivating the engine driven compressor if the engine driven compressor is on; and activating the electrically driven compressor, if the electrically driven compressor is off, to compress the refrigerant for cooling the compartment.

In some embodiments, step (E) further includes activating the electrically driven compressor, if the electrically driven compressor is off, to compress the refrigerant, thereby reducing a load on the engine driven compressor.

In some embodiments, the engine driven air conditioning system includes a heat exchanger thermally coupled to the compartment of the vehicle and a coolant pump connected to an engine coolant line for circulating a heated engine coolant from the engine to the heat exchanger. In these embodiments, if it is determined in (B) that the temperature in the compartment does not exceed the desired temperature range, (G) determining whether the engine is turned on; and (H) automatically activating the coolant pump to direct the heated engine coolant from the engine to the heat exchanger to heat the compartment of the vehicle, if the engine is turned on.

In some embodiments, the method also includes: (I) dynamically monitoring the thermal load of the compartment; and (J) automatically deactivating the engine driven compressor while maintaining activation of the electrically driven compressor, if the thermal load is dropped below the second predetermined thermal load threshold. In some embodiments, the method also includes: (K) dynamically monitoring the temperature of the compartment; and (L) automatically deactivating both the engine driven compressor and the electrically driven compressor, if the temperature of the compartment is dropped below the desired temperature range.

In some embodiments where the controller is wirelessly coupled to a mobile remote control capable of selectively activating or deactivating the controller from inside and outside of the vehicle, the method also includes: (M) selectively activating or deactivating the controller using the mobile remote control. In some embodiments, the remote control is embedded in a vehicle key or a mobile phone. In some embodiments, the controller is automatically activated when the remote control is moving towards the vehicle and within a predetermined distance from the vehicle first predetermined periphery. In some embodiments, the controller is automatically deactivated when the remote control is moving away from the vehicle and beyond the predetermined distance from the vehicle.

In some embodiments where the electrically driven unit further includes a second condenser and a first air blower positioned proximate the second condenser, the method also include: (N) automatically activating the first air blower to blow the ambient air or the air from the air intake of the engine over the second condenser when the second compressor is activated. In some embodiments where the climate system includes one or both of second and third air blowers respectively positioned proximate the condenser and the evaporator, the method also include: (O) automatically activating the second, third, or both air blowers to blow the ambient air, or the air from the air intake, of the engine respectively over the condenser and the evaporator when the electrically driven compressor or the engine driven compressor is activated.

In some embodiments, the method further includes: prior to (C) and if the measured temperature is outside of the desired temperature range, notifying an operator one or more of the following: the measured temperature, an outside temperature, a temperature difference between the measured temperature and the desired temperature range, and a temperature difference between the outside temperature and the desired temperature range. In some embodiments where the climate system includes an object sensor configured to sense presence or absence of an object in the vehicle, the method includes: prior to (C) and if the measured temperature is outside of the desired temperature range, determining whether an object is in the vehicle; and upon determining that an object is present, notifying an operator the presence of the object, and optionally notifying the operator one or more of the following: the measured temperature, an outside temperature, a temperature difference between the measured temperature and the desired temperature range, and a temperature difference between the outside temperature and the desired temperature range. In some embodiments, the method further includes: acquiring instructions from the operator whether to perform cooling or heating; and operating one or more of the following in accordance with the instruction from the operator: the engine, the engine driven compressor, the electrically driven compressor, and a coolant pump.

In some embodiments, a vehicle climate system is configured to perform any of the methods described herein. In some embodiments, a non-transitory computer-readable storage medium stores one or more programs for execution by one or more processors of a vehicle climate system, the one or more programs including instructions for performing any of the methods described herein.

Thus, devices, storage mediums, and systems are provided with methods for operating a vehicular climate system, thereby increasing the effectiveness, efficiency, and user satisfaction with such systems. Such methods may complement or replace conventional methods for operating a vehicular climate system.

The systems, devices, and methods of the present disclosure have other features and advantages that will be apparent from or are set forth in more detail in the accompanying drawings, which are incorporated herein, and the following Detailed Description.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

DETAILED DESCRIPTION

Figure 1:
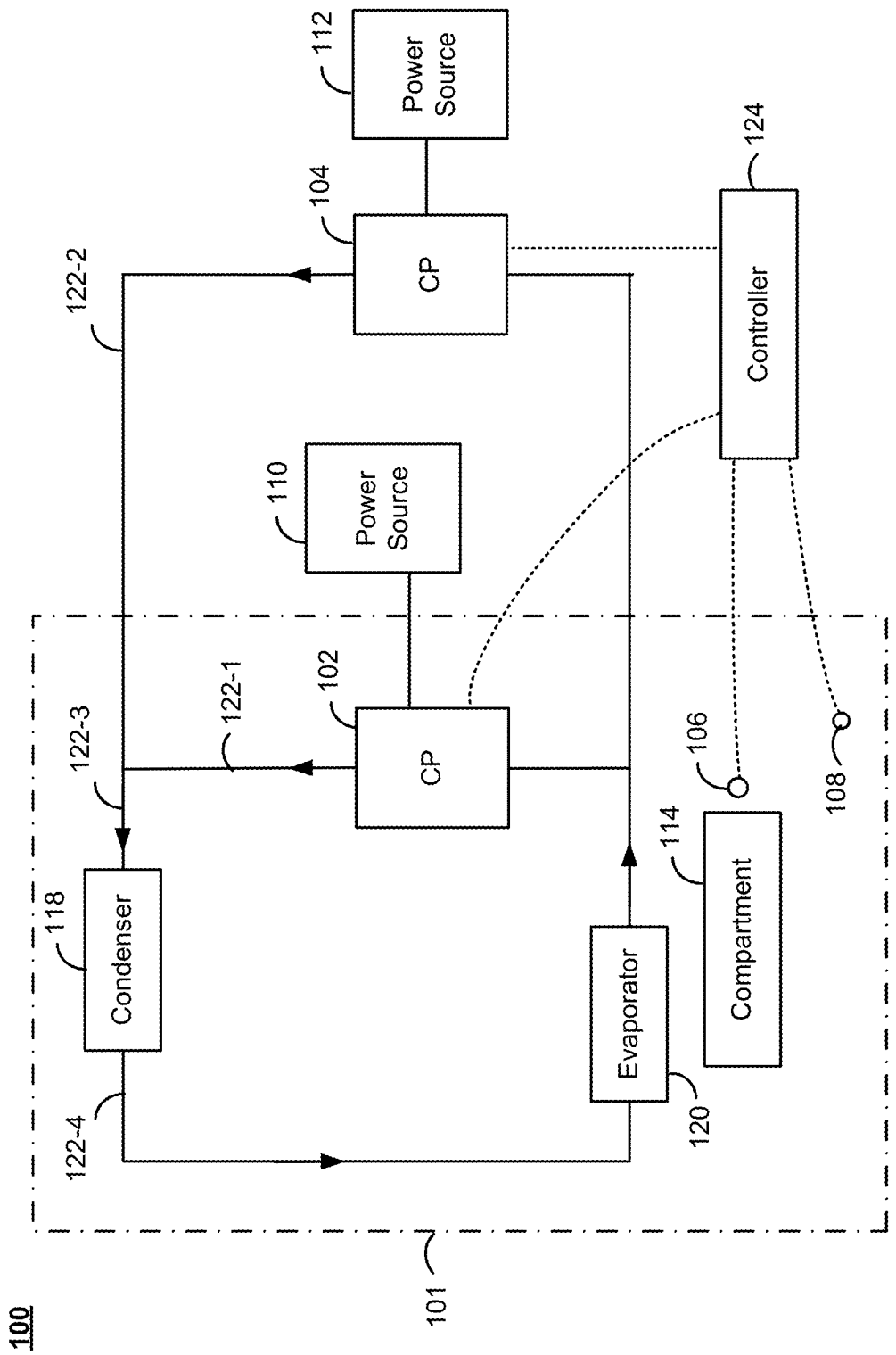
FIG. 1 is a block diagram illustrating a climate system in accordance with some embodiments.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Many modifications and variations of this disclosure can be made without departing from its spirit and scope, as will be apparent to those skilled in the art. The specific implementations described herein are offered by way of example only, and the disclosure is to be limited only by the terms of the appended claims, along with the full scope of equivalents to which such claims are entitled.

Implementations of the present disclosure are described in the context of air-conditioning systems for use in vehicles, and in particular, in the context of air-conditioning systems to cool different compartments or spaces of an over-the-road or off-road vehicle. In some implementations, the air-conditioning system comprises, or is a component of, a heating, ventilation, and air-conditioning (HVAC) system.

It is to be appreciated that the term vehicle as used herein may refer to trucks, such as tractor-trailer trucks or semi-trailer trucks, the scope of the present teachings is not so limited. The present teachings are also applicable, without limitation, to cars, vans, buses, trailers, boats, planes, and any other suitable vehicle.

A climate system of the present disclosure generally includes a primary air conditioning system and an auxiliary unit coupled to the primary air conditioning system. The auxiliary unit includes a second compressor, and in some cases also includes a second condenser. The primary air conditioning system is optionally a conventional air conditioning system, and the auxiliary unit is optionally integrated into such a conventional air conditioning system with no or minimal modification on the conventional air conditioning system. The second compressor and/or the auxiliary unit is powered by a power source other than the vehicle's engine. When desired, it is turned on to provide cooling when the engine is off. It is optionally turned on while the engine is running, to either allow the engine to be turned off, or to reduce the thermal load on a engine-powered first compressor (e.g., a belt-driven compressor) to reduce fuel consumption.

The climate system of the present disclosure also includes a controller, and the present disclosure provides novel methods to control the operation of the primary air conditioning system and the auxiliary unit. The methods enable automatic control of the primary air conditioning system and the auxiliary unit based on thermal loads and/or other factors. In some embodiments, the controller is activated or deactivated by a remote control inside or outside of the vehicle, facilitating the capability of pre-conditioning the vehicle prior to entry.

FIG. 1 depicts a representative climate system (100) in accordance with some embodiments. As shown, the climate system includes a primary air conditioning system (101), a second compressor (104) fluidly coupled to the primary air conditioning system, and a controller (124). The primary air conditioning system (101) includes a temperature sensor (106), a user interface, (108), and a first compressor (102). In some embodiments, the user interface comprises an input mechanism. The temperature sensor (106) is configured to measure a temperature within a compartment (114) of the vehicle. The temperature sensor is optionally any suitable sensors, including contact or non-contact sensors. The temperature sensor is optionally configured to be placed inside or outside of the compartment. The user interface (108) (e.g., a thermostat) is configured to set and/or receive a desired temperature of the compartment (114) from a user. In some embodiments, one single device (e.g., a thermostat) functions as both the temperature sensor (106) and the user interface (108). The first compressor (102) is driven by a power source (110), such as an engine of the vehicle, to compress a refrigerant while the engine of the vehicle is on. In some embodiments, the first compressor is configured to deactivate in accordance with a determination that the engine is shut-off.

In some embodiments, the primary air conditioning system (101) includes a condenser (118) and an evaporator (120). The first compressor (102), the condenser (118) and the evaporator (120) are fluidly connected by refrigerant lines (e.g., 122-1, 122-3, 122-4), and form a refrigerant loop. The evaporator (120) is thermally coupled to the compartment (114) of the vehicle to cool the compartment (114). As used herein, the term "thermally coupled" refers to one or more of the following: (i) a device (e.g., the evaporator) is mounted within a corresponding compartment to exchange heat with that compartment, or with the air in that compartment, and (ii) the device (e.g., the evaporator) is coupled with another device (e.g., heat exchanger or air blower) which exchanges heat (e.g., introduces conditioned air) with that compartment. The compartment (114) is optionally a cab compartment, a sleeper compartment, a combination of cab and sleeper compartments, or any other space in a vehicle.

The second compressor (104) is driven by a power source (112), such as an electric motor, to compress a refrigerant. In some embodiments, the electric motor is powered by a battery that is charged by the engine during operation of the engine, by a solar panel installed on the vehicle, or by a combination thereof. In some embodiments, the second compressor (104) is fluidly coupled in parallel with the first compressor (102), and fluidly coupled in series with the first condenser (118) and the first evaporator (120) of the primary air conditioning system (101).

The controller (124) is electrically coupled to the first compressor (102) and the second compressor (104). The controller is configured to obtain the desired temperature of the compartment from the user interface (108), and obtain the measured temperature of the compartment from the sensor (106). In some embodiments, the controller is configured to obtain a desired temperature range for the compartment from the user interface (108). In some embodiments, the controller is configured to determine a desired temperature range based on the obtained desired temperature. In some embodiments, the controller determines a desired temperature range of +/−1 degree, 2 degrees, or 3 degrees of the obtained desired temperature. For example, a user enters a desired temperature of 72 degrees and the controller sets a desired temperature range of 73-71 degrees. In some embodiments, based at least partially on a difference between the desired temperature and the measured temperature, the controller calculates a thermal load of the compartment. In some embodiments, based at least partially on a difference between the desired temperature range and the measured temperature, the controller calculates a thermal load of the compartment. For example, the controller calculates a thermal load based on a mid-point of the desired temperature range and/or an upper boundary of the desired temperature range.

Based on the calculated thermal load, the controller (124) controls the operations of the first and second compressors, to achieve efficient cooling effects and/or reduce fuel consumption. For example, upon determining that the thermal load exceeds a first predetermined thermal load threshold (e.g., a thermal load capacity of the first compressor), the controller (124) automatically, without human intervention, turns-on the engine (if the engine was previously off), and enables both the first and second compressors to compress the refrigerant for cooling the compartment. Upon determining that the thermal load does not exceed the first predetermined thermal load threshold but does exceed a second thermal load threshold (e.g., the a thermal load capacity of the second compressor), the controller (124) automatically, without human intervention, turns-on the engine (if the engine was previously off), and enables the first compressor to compress the refrigerant for cooling the compartment. Upon determining that the thermal load does not exceed the second predetermined thermal load threshold, the controller (124) enables the second compressor to compress the refrigerant for cooling the compartment, and optionally disables the first compressor.

In some embodiments, upon determining that the thermal load does not exceed the first predetermined thermal load threshold but does exceed a second thermal load threshold, the control also enables the second compressor to assist in compression of the refrigerant for cooling the compartment. This reduces the thermal load on the first compressor, and consequently reduces the fuel consumption.

Figure 2:
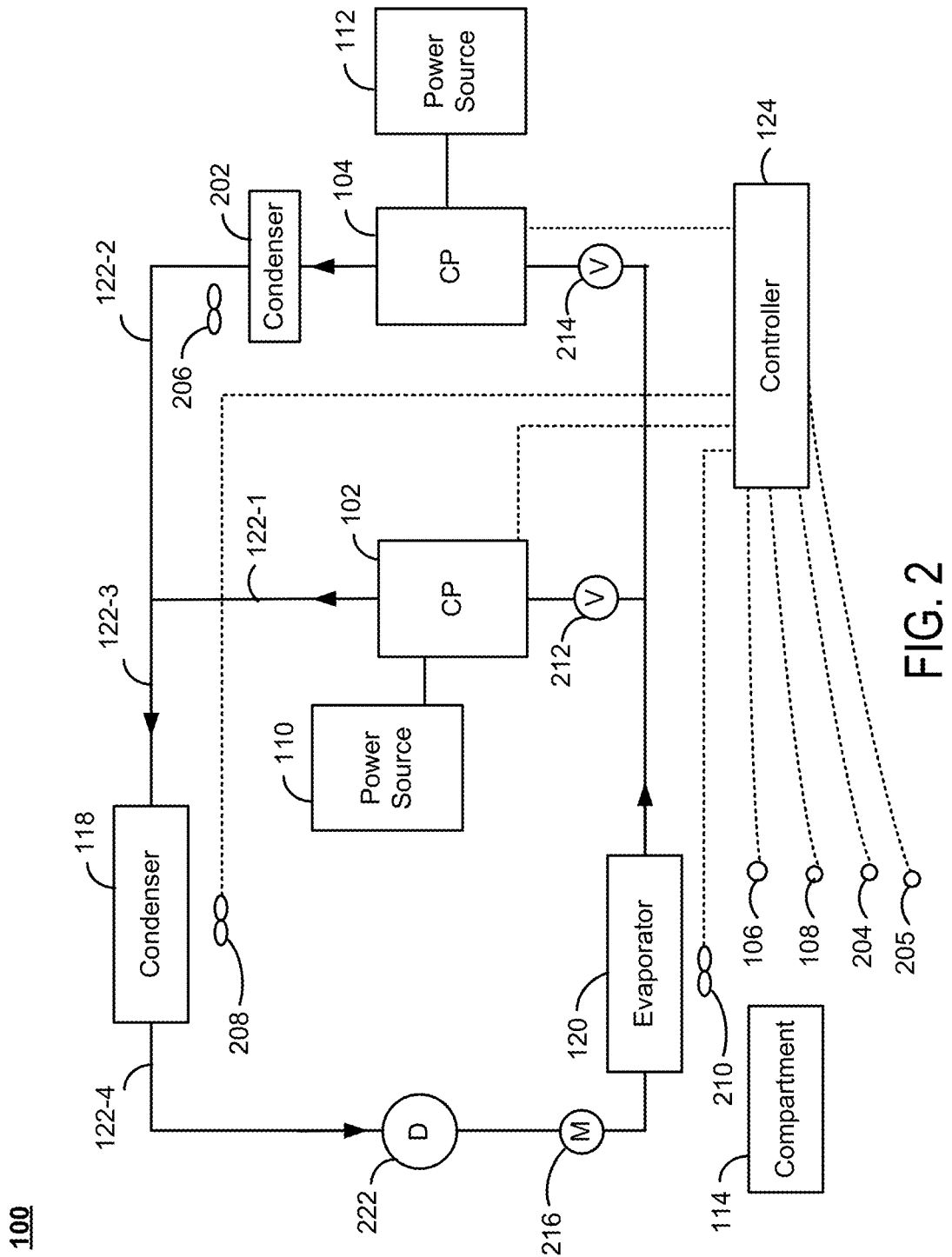
FIG. 2 is a block diagram illustrating the climate system of FIG. 1 including additional components in accordance with some embodiments.
Figure 3B:
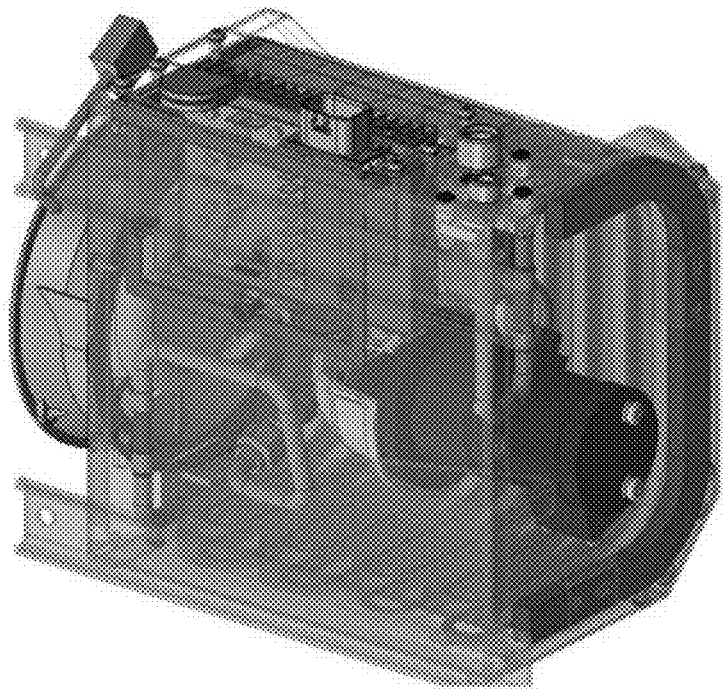
FIGS. 3A and 3B are perspective views illustrating an auxiliary unit of a climate system in accordance with some embodiments.
Figure 3A:
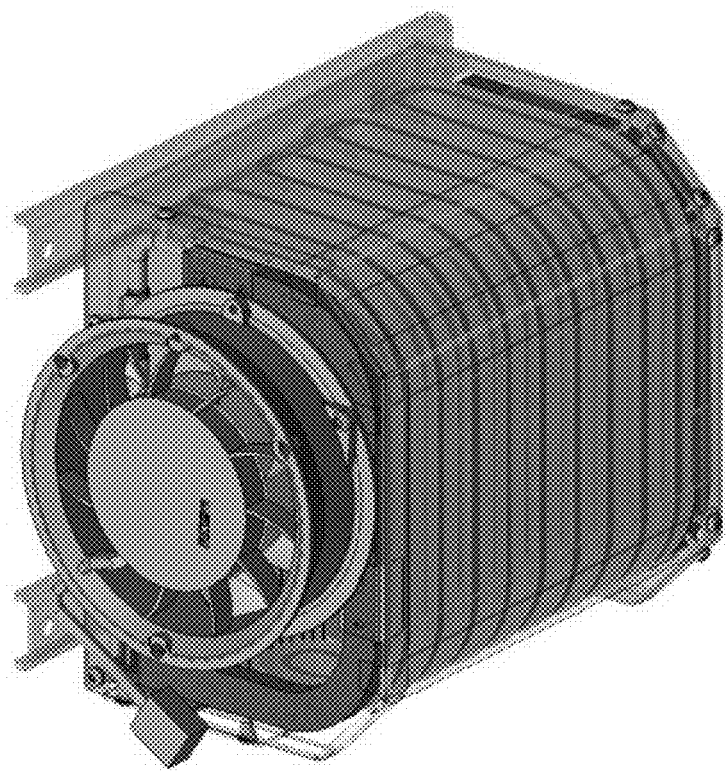

Referring to FIG. 2, in some embodiments, the climate system (100) further includes a second condenser (202) disposed downstream of the second compressor (104) and fluidly coupled to the second compressor. The second condenser (202) condenses the refrigerant compressed by the second compressor. Collectively, the second compressor (104) and the second condenser (202) form an auxiliary unit (302) fluidly coupled in parallel with the first compressor (102) and fluidly coupled in series with the first condenser and the first evaporator of the first air conditioning system (101). In some embodiments, such as those illustrated in FIGS. 3A and 3B, the second compressor (104) and the second condenser (202) are integrated to form one single unit. In some embodiments, the primary air conditioning system (101) is a conventional air conditioning system; and coupling the second compressor (104), or the auxiliary unit (302), to the primary air conditioning system requires no or minimal modifications on the primary air conditioning system. In some instances and implementations, due to the two condensers (118, 202) being in series, the first condenser (118) provides additional thermal transfer (e.g., via convection) without the need for an active air mover (e.g., activation of air blower 208). In some implementations, the first condenser (118) is configured so as to account for the additional thermal transfer (e.g., downsized). In some instances and implementations, the second condenser (202) provides additional thermal transfer (e.g., via convection) without the need for an active air mover (e.g., activation air blower 206). In some implementations, the second condenser (202) is configured so as to account for the additional thermal transfer (e.g., downsized). In some implementations, the climate system is configured such that only one of the two condensers (118, 202) is operating in at least some modes. In some implementations, the climate system is configured such that only one of the two air blowers (206, 208) is operating in at least some modes.

In some embodiments, the auxiliary unit (302) includes a first air blower (206) positioned proximate the second condenser (202) and configured to blow ambient air and/or air from an air intake of the engine over the second condenser (202). In some embodiments, the first air blower (206) is electrically coupled to the controller (124). In some embodiments, when the second compressor is activated, the controller (124) automatically activates the first air blower to blow the ambient air and/or the air from the air intake of the engine over the second condenser (202), thereby providing air that is not affected by the engine heat load (e.g., air not heated by the engine).

In some embodiments, the primary air conditioning system (101) includes one or more air blowers positioned proximate the first condenser and/or the first evaporator of the primary air conditioning system. As an example, FIG. 2 illustrates a second air blower (208) positioned proximate the first condenser (118), and a third air blower (210) positioned proximate the first evaporator (120). In some embodiments, the second and third air blowers are electrically connected to the controller (124), and configured to blow ambient air and/or air from an air intake of the engine over the first condenser and the evaporator respectively. In some embodiments, when the second compressor or the first compressor is activated, the controller (124) automatically activates the second and third air blowers to blow the ambient air and/or the air from the air intake of the engine over the first condenser and the first evaporator respectively.

In some embodiments, the primary air conditioning system (101) further includes one or more flow control valves to control the refrigerant flowing to the first, second, or both compressors. For example, FIG. 2 illustrates a first flow control valve (212) disposed upstream of the first compressor (102), and a second flow control valve (214) disposed upstream of the second compressor (104). The first flow control valve (212) is configured to selectively restrict and permit flow of the refrigerant to the first compressor (102). The second flow control valve (214) is configured to selectively restrict and permit flow of the refrigerant to the second compressor (104). In some embodiments, the primary air conditioning system (101) further includes a metering device (216) disposed upstream of the first evaporator and configured to control flow of the refrigerant into the first evaporator.

In some embodiments, the primary air conditioning system (101) further comprises a receiver and/or drier (222) disposed between the first condenser system and the first evaporator and configured for performing one or more of the following: temporarily storing the refrigerant, and absorbing moisture from the refrigerant.

In some embodiment, the climate system (100) further includes an object sensor (205) configured to sense whether an object (e.g., temperature-sensitive object) is present in the vehicle (e.g., in the compartment). Examples of the object sensor include, but are not limited to, motion detectors, mass or weight sensors, infrared sensors or cameras (e.g., detecting objects by temperature differences relative to surroundings), visual sensors (e.g., detecting objects by color, shape or texture), or a combination of two or more different types of sensors. Examples of temperature-sensitive object include, but are not limited to, pets, medicines, drinks, foods, and/or plants.

Figure 4:
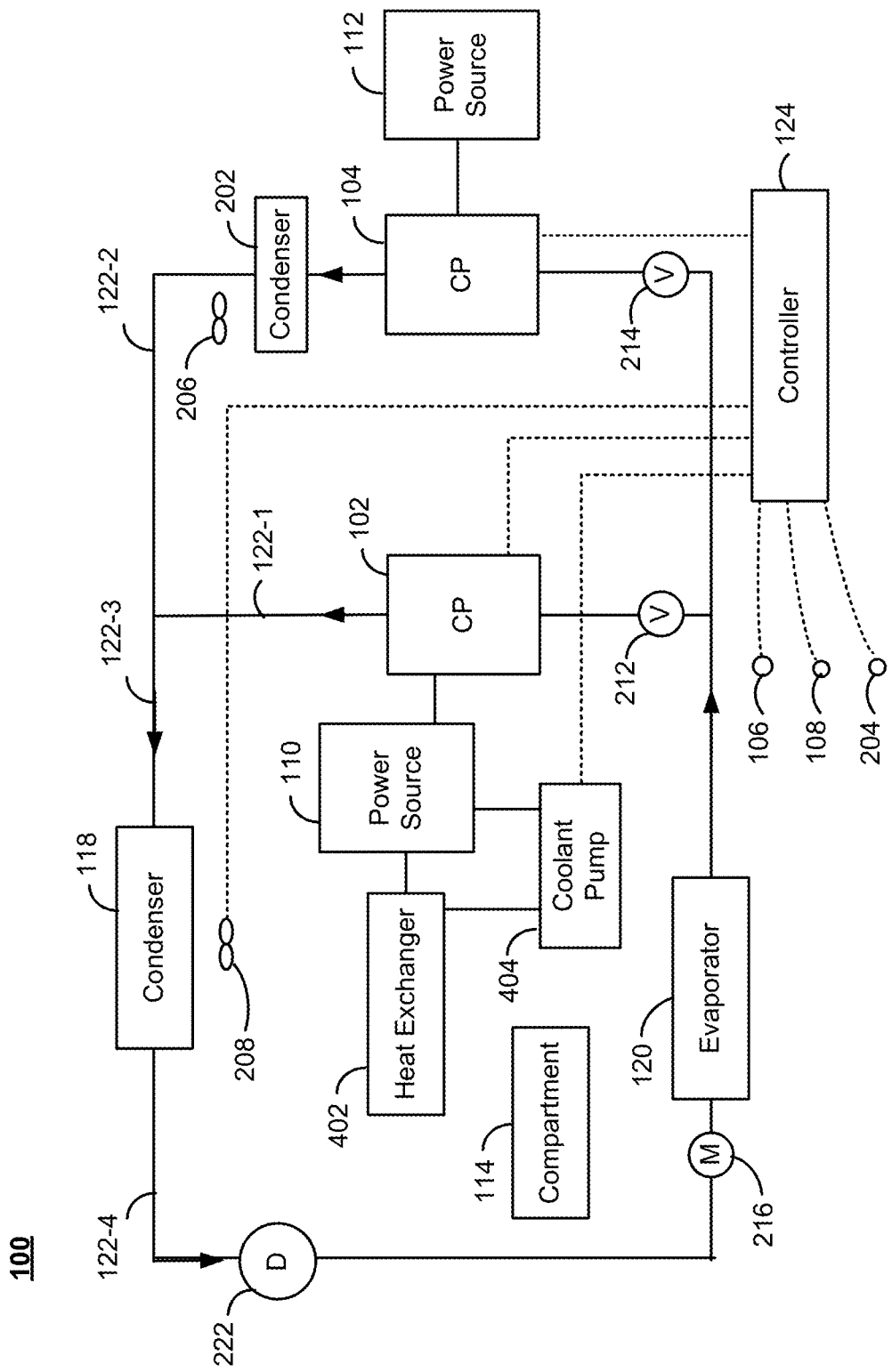
FIG. 4 is a block diagram illustrating the climate system of FIG. 1 including additional components in accordance with some embodiments.

Referring to FIG. 4, in some embodiments, the primary air conditioning system (101) includes a heat exchanger (402) and a coolant pump (404) for heating the compartment. The heat exchanger (402) is thermally coupled with the compartment of the vehicle (e.g., installed at the compartment, or connected to the compartment via a duct). The coolant pump (404) is connected to (or fluidly coupled to) an engine coolant line. When activated, the coolant pump circulates a heated engine coolant from the engine to the heat exchanger (402) to heat the compartment of the vehicle. In some embodiments, if the temperature in the compartment does not exceed (or does not meet or exceed) the desired temperature and if the engine is turned on, the controller (124) is configured to automatically activate the coolant pump (404) to direct the heated engine coolant from the engine to the heat exchanger (402) to heat the compartment of the vehicle.

Figure 5B:
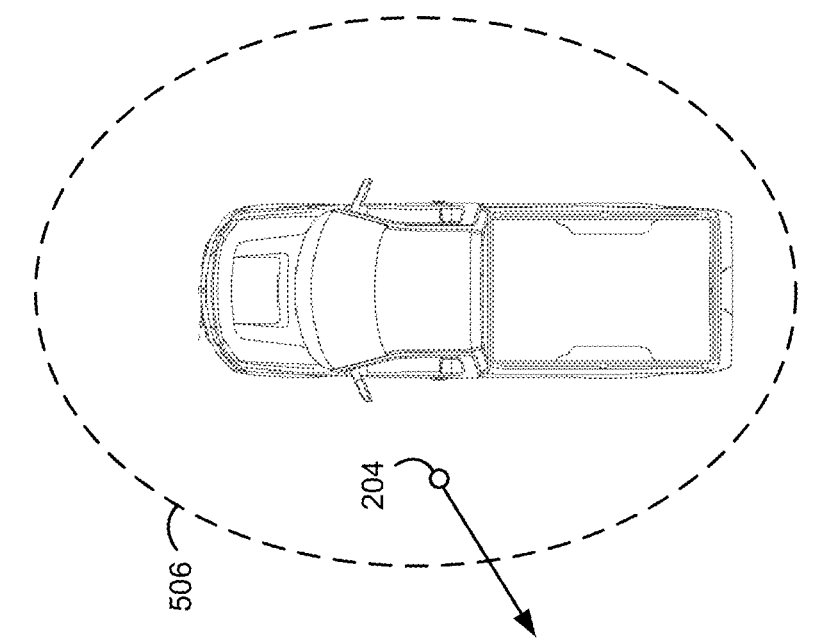
FIGS. 5A and 5B are block diagrams illustrating the use of a remote control to activate a climate system in accordance with some embodiments.
Figure 5A:
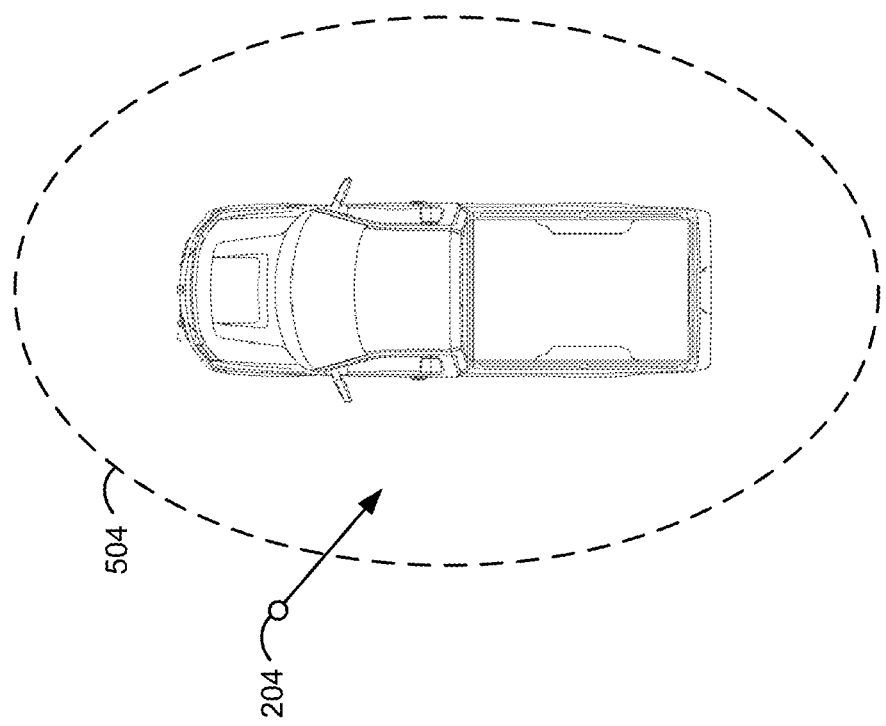

Referring to FIGS. 5A and 5B, in some embodiments, the climate system includes a mobile remote control (204), or the controller (124) is wirelessly coupled to a mobile remote control (204), capable of selectively activating or deactivating the controller from inside and outside of the vehicle. This enables pre-conditioning the vehicle (e.g., cooling or heating the vehicle before an operator enters the vehicle) when desired. In some embodiments, the remote control (204) is embedded in a vehicle key or a mobile phone. In some embodiments, the remote control (204) includes a manual user interface (e.g., a push button) to activate or deactivate the controller. In some embodiments, the controller is automatically activated when the remote control (204) is moving towards the vehicle and passing a first predetermined periphery, as illustrated in FIG. 5A. In some embodiments, the controller is automatically activated when the remote control (204) is moving towards the vehicle and within a predetermined distance from the vehicle (e.g., 1, 5, or 10 feet), or a particular component of the vehicle (e.g., the driver's seat). In some embodiments, the controller is automatically deactivated when the remote control (204) is moving away from the vehicle and passing a second predetermined periphery (506), as illustrated in FIG. 5B. In some embodiments, the controller is automatically deactivated when the remote control (204) is moving away from the vehicle and is not within a predetermined distance from the vehicle (e.g., 2, 10, or 15 feet), or a particular component of the vehicle (e.g., the driver's seat). It should be noted that the first and second predetermined peripheries are optionally the same as or different from one another (e.g., in terms of sizes, shapes, or locations). Also, it should be noted that the first predetermined periphery optionally resides within or overlaps with the second predetermined periphery, or vice visa. Further, it should be noted that the shape of the first or second predetermined periphery is optionally regular (e.g., a circle or oval) or irregular.

Figure 6:
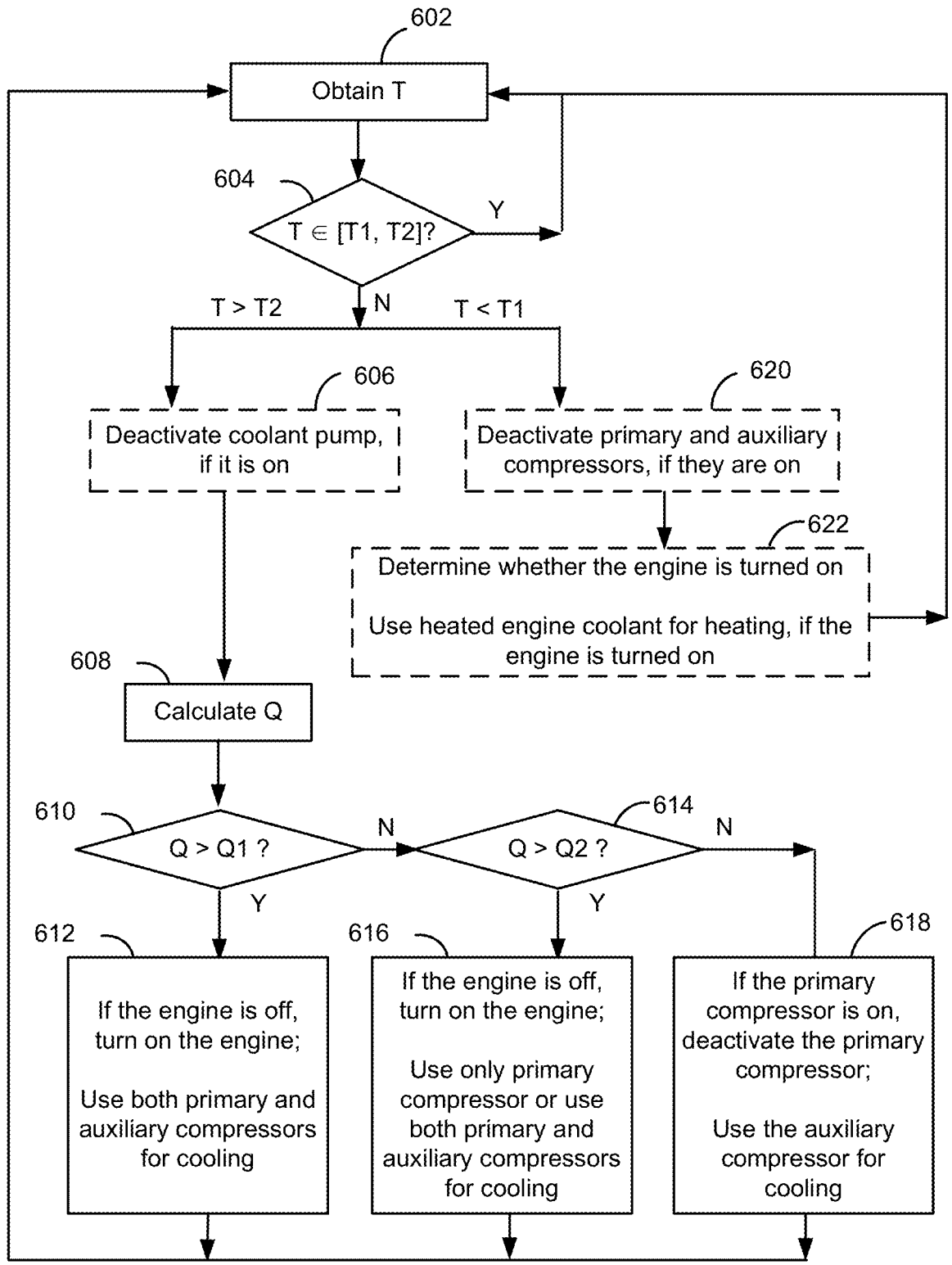
FIG. 6 is a flowchart illustrating a method for controlling a climate system in accordance with some embodiments.

FIG. 6 depicts a method (600) for controlling a climate system in accordance with some embodiments. In some embodiments, the method (600) is performed by a climate system, such as the climate system (100), or one or more components of the climate system, such as controller (124). In some embodiments, the method (600) is performed by a device or controller coupled to the climate system. Thus, in some embodiments, the operations of the method 600 described herein are entirely interchangeable, and respective operations of the method 600 are performed by any of the aforementioned devices, systems, or combination of devices and/or systems. In some embodiments, the method (600) is governed by instructions that are stored in a non-transitory computer-readable storage medium and that are executed by one or more processors of the climate system, such as the one or more processors of controller (124). For convenience, the method (600) is described below as being performed by a system, such as the climate system (100).

In some embodiments, the climate system, such as the climate system (100), is installed in a vehicle for heating and cooling a compartment of the vehicle. In some embodiments, the climate system includes a primary air conditioning system, such as the primary air conditioning system (101), an auxiliary unit, such as the auxiliary unit (302), and a controller, such as the controller (124). In some embodiments, the primary air conditioning system includes a first compressor such as the first compressor (102) driven by an engine of the vehicle, a first condenser such as the first condenser (118), and a first evaporator such as the first evaporator (120) thermally coupled to the compartment of the vehicle to cool the compartment. In some embodiments, the auxiliary unit includes a second compressor such as the second compressor (104) fluidly coupled in parallel with the first compressor and in series with the first condenser and the first evaporator.

The system obtains (602) a temperature for the compartment (T), and determines (604) whether the temperature in the compartment is within a desired temperature range ([T1, T2]), where T2 is equal to or greater than T1. In some embodiments, the desired temperature range ([T1, T2]) is based on a desired temperature obtained from a user (e.g., is +/−1, 2, or 3 degrees from the desired temperature). In some embodiments, the system determines whether the temperature in the compartment is below T1, within [T1, T2] (either inclusively or exclusively), or above T2. If the temperature in the compartment is above the desired temperature range, the system calculates (608) a thermal load of the compartment (Q) based at least partially on the desired temperature range and the measured temperature, and determines (610 and 614) whether the thermal load exceeds (or meets or exceeds) first and second predetermined thermal load thresholds (Q1, Q2). In some embodiments, the determination of whether the thermal load exceeds (or meets or exceeds) the first and second predetermined thermal load thresholds is performed concurrently, or the order of the determination is alternated. In some embodiments, the first predetermined thermal load threshold is the cooling capacity of the first compressor. In some embodiments, the second predetermined thermal load threshold is the cooling capacity of the second compressor.

Upon determining that the thermal load exceeds (or meets or exceeds) the first predetermined thermal load threshold, the system (612): (1) turns on the engine if the engine is off; (2) activates the first compressor if the first compressor is off, to compress the refrigerant for cooling the compartment; and (3) activates the second compressor, if the second compressor is off, to compress the refrigerant for cooling the compartment. In some embodiments, the system enables various components, which includes powering the components on, if necessary. In some embodiments, the system disables various components, which includes powering down the components. For example, upon determining that the thermal load exceeds (or meets or exceeds) the first predetermined thermal load threshold, the system: (1) enables the engine; (2) enables the first compressor to compress the refrigerant for cooling the compartment; and (3) enables the second compressor to compress the refrigerant for cooling the compartment Upon determining that the thermal load does not exceed the first predetermined thermal load threshold but does exceed (or meets or exceeds) a second predetermined thermal load threshold, the system (616): (1) turns on the engine if the engine is off; and (2) activates the first compressor, if the first compressor is off, to compress the refrigerant for cooling the compartment. In some embodiments, upon determining that the thermal load does not exceed the first predetermined thermal load threshold but does exceed a second predetermined thermal load threshold, the system: (1) enables the engine; and (2) enables the first compressor to compress the refrigerant for cooling the compartment. In some embodiments, the system also activates the second compressor, if the second compressor is off, to compress the refrigerant. This results in reduction of the load on the first compressor, reduction of engine power needed for operating the first compressor, and consequently reduction of the fuel consumption. This also results in additional output capacity, if needed.

Upon determining that the thermal load does not exceed the second predetermined thermal load threshold, the system (618): (1) deactivates the first compressor if the first compressor is on; and (2) activates the second compressor if the second compressor is off or maintains activation of the second compressor, to compress the refrigerant for cooling the compartment. In some embodiments, upon determining that the thermal load does not exceed the second predetermined thermal load threshold, the system: (1) disables the first compressor; and (2) enables the second compressor to compress the refrigerant for cooling the compartment.

In some embodiments, the method includes additional or optional steps. For example, in some embodiments where the primary air conditioning system further comprises a heat exchanger, such as the heat exchanger (402), thermally coupled to the compartment of the vehicle and a coolant pump such as the coolant pump (404) connected to an engine coolant line, the method additionally or optionally includes the system determining (622) whether the engine is turned on. Upon determining that the engine is turned on, the system automatically activates the coolant pump to direct the heated engine coolant from the engine to the heat exchanger to heat the compartment of the vehicle.

In some embodiments, additionally or optionally, the method includes dynamically monitoring the temperature of the compartment, and operating the first compressor, the second compressor, and/or the coolant pump accordingly. The monitoring of the temperature can be achieved, for example, by obtaining the compartment temperature (602) after the cooling or heating is performed (e.g., at 612, 616, 618, and/or 622). In some embodiments, the system obtains (602) the compartment temperature at a predefined interval (e.g., every 10 seconds, 30 seconds, or 1 minute). Upon determining that the temperature of the compartment is above the desired temperature range, the system automatically deactivates (606) the coolant pump if the coolant pump is on. Upon determining that the temperature of the compartment has dropped below the desired temperature range, the system automatically deactivates (620) both the first compressor and the second compressor if they are on. Upon determining that the temperature of the compartment is within the desired temperature range, the system optionally sleeps for a preset amount of time (e.g., every 10 seconds, 30 seconds, or 1 minute), obtains a new compartment temperature, or ends the control process.

Figure 7:
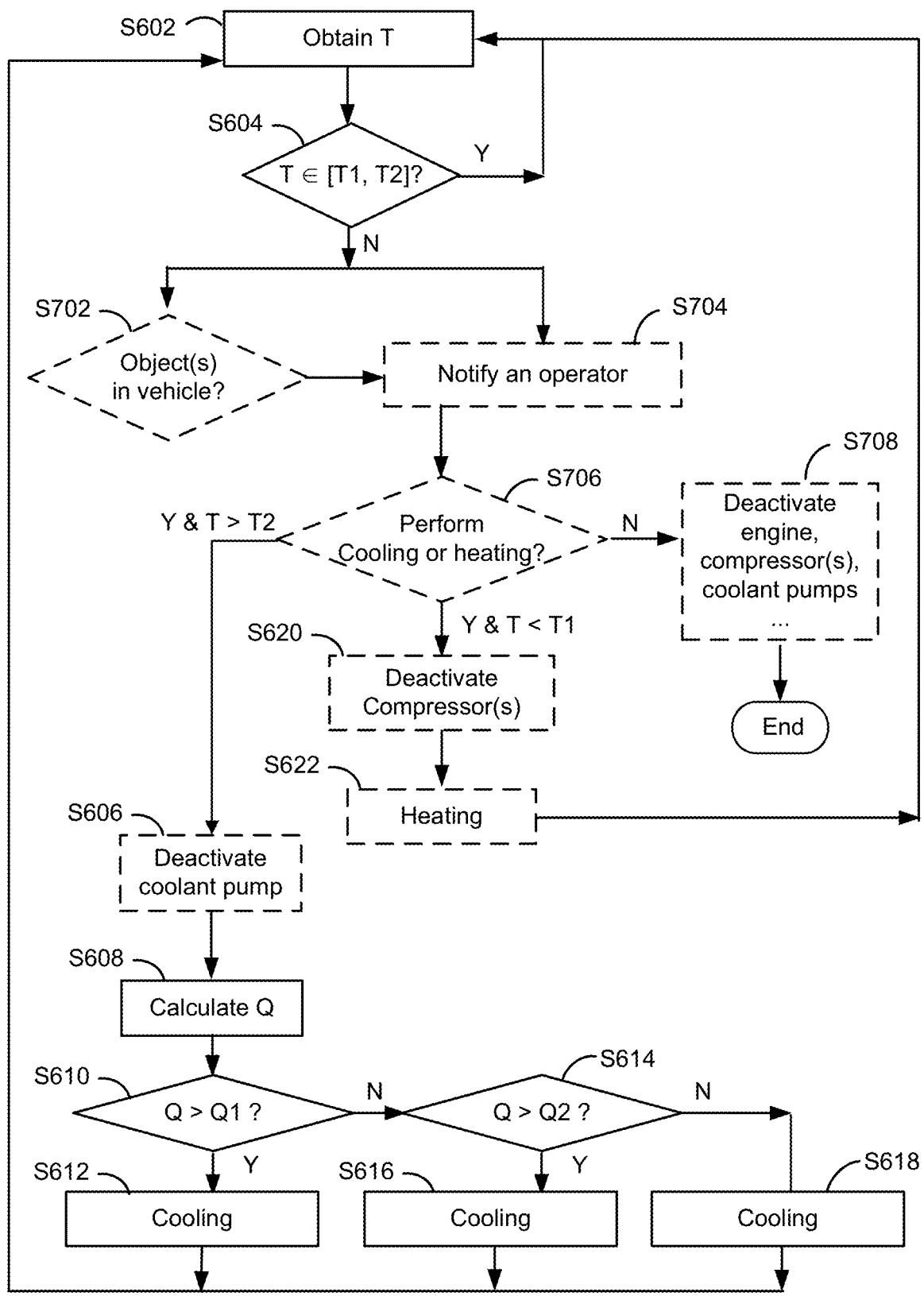
FIG. 7 is a flowchart illustrating another method for controlling a climate system in accordance with some embodiments.

Referring to FIG. 7, in some embodiments, the system notifies (704) an operator (e.g., a driver) if it is determined that the measured temperature is outside of the desired temperature range. The notification is optionally an audio notification (e.g., alarm), a visual notification (e.g., text message), or in any suitable format. In some embodiments, the system notifies the operator one or more of the following: the measured temperature, an outside temperature (e.g., a temperature outside of the vehicle), a temperature difference between the measured temperature and the desired temperature range, a temperature difference between the outside temperature and the desired temperature range.

In some embodiments where the climate system further includes an object sensor, such as the object sensor (205), configured to sense a particular object (or type of object), the system determines (702) whether the particular object is in the vehicle (e.g., in accordance with a determination that the measured temperature is outside of the desired temperature range). Upon determining that the particular object is present, the system notifies (704) an operator as to the presence of the object. The notification is optionally audio (e.g., alarm), visual (e.g., text message, image of the object, cartoon), or any other suitable format. In some embodiments, the system notifies the operator as to the presence of the object, along with one or more of the following: the measured temperature, an outside temperature (e.g., a temperature outside of the vehicle), a temperature difference between the measured temperature and the desired temperature range, a temperature difference between the outside temperature and the desired temperature range.

In some embodiments, the system requests (706) instruction from the operator as to whether to perform cooling or heating; and operates the engine, the primary air conditioning system, the second compressor, and/or other components accordingly. For example, upon receiving instructions from the operator that cooling or heating is desired, the method proceeds to S606 or S608 if the measured temperature is above the desired temperature range, or proceeds to S620 or S622 if the measured temperature does not exceed the desired temperature range. In some embodiments, upon receiving instructions from the operator that cooling or heating is not desired, the method proceeds to S706 to prepare ending of the control process, regardless of the temperature. In some embodiments, upon receiving instructions from the operator that cooling or heating is not desired, the system sleeps for a preset amount of time (e.g., 1 minute, 5 minutes, or 10 minutes) before obtaining (602) a temperature for the compartment. In some embodiments, the system deactivates (708) one or more of the following: the engine, the first compressor, the second compressor, and the coolant pump, if they are on.

It should be noted that, although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof. As an example, detection (702) of the presence or absence of an object is optionally performed before temperature measurement (602). It is also optionally performed after temperature measurement (602) but before the temperature determination (604). As another example, deactivation (606) of the coolant pump is optionally performed before detection (702) of the presence or absence of an object, or before notification (704) of the operator. Similarly, deactivation (620) of the compressor(s) is optionally performed before detection (702) of the presence or absence of an object, or before notification (704) of the operator.

In some embodiments, the method includes other additional or optional steps. For example, in some embodiments where the climate system includes a remote control or the controller is coupled to a remote control such as the remote control (204), the method includes selectively activating or deactivating the controller using the mobile remote control (manually or automatically). In some embodiments, the controller is automatically activated when the remote control is moving towards the vehicle and passing a first predetermined periphery such as the first predetermined periphery (504). In some embodiments, the controller is automatically deactivated when the remote control is moving away from the vehicle and passing a second predetermined periphery such as the second predetermined periphery (506).

In some embodiments where the auxiliary unit further comprises an second condenser such as the second condenser (202) and a first air blower such as the first air blower (206) positioned proximate the second condenser, the method includes automatically activating the first air blower to blow the ambient air or the air from the air intake of the engine over the second condenser when the second compressor is activated. In some embodiments where the primary air conditioning system includes one or both second and third air blowers such as the second and third air blowers (208, 210) respectively positioned proximate the first condenser and the first evaporator, the method includes automatically activating one or both of the second and third air blowers to blow the ambient air or the air from the air intake of the engine respectively over the first condenser and the first evaporator when the second compressor or the first compressor is activated. The activation of the first, second, and third air blowers can be performed in the same operation as the activation of the second compressor and the first compressor (e.g., at 612, 616, or 618). It can also be performed separately, or with a preset time delay.

It will also be understood that, although the terms primary, auxiliary, first, second, etc. are, in some instances, used herein to describe various elements, these elements should not be limited by these terms. These terms are only used to distinguish one element from another. For example, a first blower could be termed a second blower, and, similarly, a second blower could be termed a first blower, without departing from the scope of the various described embodiments. The first blower and the second blower are both blowers, but they are not the same blower.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A climate system for conditioning a compartment of a vehicle, comprising:
one or more sensors configured to obtain measurements corresponding to a vehicle;
a first compressor driven by an engine of the vehicle, the first compressor configured to compress a refrigerant;
a second compressor driven by an electric motor, the second compressor configured to compress the refrigerant; and
a controller electrically coupled to the first compressor, the second compressor, and the one or more sensors, the controller configured to:
receive a user defined temperature threshold for a compartment of the vehicle;
in accordance with a determination that the measurements obtained via the one or more sensors indicate that a temperature within the compartment of the vehicle exceeds the user defined temperature threshold, determine a thermal load of the compartment, wherein the thermal load of the compartment is based, at least partially, on a difference between the user defined temperature threshold and the temperature within the compartment of the vehicle, and
operate the climate system in a predetermined mode based on the thermal load exceeding one or more predetermined thermal load thresholds, wherein:
the predetermined mode is initiated in accordance with a determination that the thermal load exceeds a second predetermined thermal load threshold less than a first predetermined thermal load threshold, and
operating the climate system in the predetermined mode includes activating the first compressor to cool the compartment of the vehicle.

2. The climate system of claim 1, wherein the controller is further configured to:
in accordance with a determination that the thermal load does not exceeds the one or more predetermined thermal load thresholds, operate the climate system in a third predetermined mode, the third predetermined mode including activating the second compressor to cool the compartment of the vehicle.

3. The climate system of claim 1, further comprising:
a coolant pump fluidically coupled to an engine coolant line; and
the controller is further configured to:
in accordance with a determination that the measurements obtained via the one or more sensors indicate that the temperature within the compartment of the vehicle is below the user defined temperature threshold, operate the climate system in a heating mode, the heating mode including disabling the first compressor and second compressor and activating the cooling pump.

4. The climate system of claim 1, wherein the controller is further configured to:
in response to a determination, based on the measurements obtained via the one or more sensors, that an object is within the compartment of the vehicle, requesting instructions from a user to operate the climate system.

5. The climate system of claim 1, wherein the controller is further configured to:
in accordance with a determination that the measurements obtained via the one or more sensors indicate that the temperature within the compartment of the vehicle is not within the user defined temperature threshold, providing a notification to the user.

6. The climate system of claim 1, wherein the controller is further configured to:
after operating the climate system in the predetermined mode, in accordance with a determination that the measurements obtained via the one or more sensors indicate that the temperature within the compartment of the vehicle is within the user defined temperature threshold, cease operating the climate system in the predetermined mode.

7. The climate system of claim 1, wherein the second compressor fluidically coupled in parallel with the first compressor.

8. The climate system of claim 1, wherein the predetermined mode is a second first predetermined mode and operating the climate system in the second predetermined mode includes:
in accordance with a determination that the engine of the vehicle is off, turning on the engine of the vehicle.

9. The climate system of claim 1, wherein:
the predetermined mode is a second first predetermined mode,
a first predetermined mode is initiated in accordance with a determination that the thermal load exceeds a first predetermined thermal load threshold; and
operating the climate system in the first predetermined mode includes activating the first compressor and the second compressor to cool the compartment of the vehicle.

10. The climate system of claim 9, wherein operating the climate system in the first predetermined mode includes:
in accordance with a determination that the engine of the vehicle is off, turning on the engine of the vehicle.

11. The climate system of claim 1, further comprising a mobile remote control wirelessly coupled to the controller, the mobile remote control configured to selectively activate and deactivate the controller from inside and outside of the vehicle.

12. The climate system of claim 11, wherein the mobile remote control is embedded in a mobile phone and/or a key.

13. The climate system of claim 11, wherein the mobile remote control is configured to automatically activate the controller in accordance with a determination that the remote control is moving towards the vehicle and is within a first predetermined periphery around the vehicle.

14. The climate system of claim 13, wherein the mobile remote control is configured to automatically deactivate in accordance with a determination that the remote control is moving away from the vehicle and is beyond a second predetermined periphery from the vehicle.

15. A non-transitory computer-readable storage medium including instructions that, when executed by a controller of a climate system for conditioning a compartment of a vehicle, cause the controller to:
receive a user defined temperature threshold for a compartment of a vehicle;
in accordance with a determination that measurements obtained via one or more sensors of the vehicle indicate that a temperature within the compartment of the vehicle exceeds the user defined temperature threshold, determine a thermal load of the compartment, wherein the thermal load of the compartment is based, at least partially, on a difference between the user defined temperature threshold and the temperature within the compartment of the vehicle; and operate a climate system in a predetermined mode based on the thermal load exceeding one or more predetermined thermal load thresholds, wherein:

the predetermined mode is initiated in accordance with a determination that the thermal load exceeds a second predetermined thermal load threshold less than a first predetermined thermal load threshold, and operating the climate system in the predetermined mode includes activating a first compressor to cool the compartment of the vehicle.

16. The non-transitory computer-readable storage medium of claim 15, wherein:

the predetermined mode is a second first predetermined mode;

a first predetermined mode is initiated in accordance with a determination that the thermal load exceeds a first predetermined thermal load threshold; and operating the climate system in the first predetermined mode includes activating a first compressor and a second compressor of the climate system to cool the compartment of the vehicle.

17. A method for controlling a climate system installed in a vehicle, the method comprising:

receiving a user defined temperature threshold for a compartment of a vehicle;

in accordance with a determination that measurements obtained via one or more sensors of the vehicle indicate that a temperature within the compartment of the vehicle exceeds the user defined temperature threshold, determining a thermal load of the compartment, wherein the thermal load of the compartment is based, at least partially, on a difference between the user defined temperature threshold and the temperature within the compartment of the vehicle, and operating a climate system in a predetermined mode based on the thermal load exceeding one or more predetermined thermal load thresholds, wherein:

the predetermined mode is initiated in accordance with a determination that the thermal load exceeds a second predetermined thermal load threshold less than a first predetermined thermal load threshold, and operating the climate system in the predetermined mode includes activating a first compressor to cool the compartment of the vehicle.

18. The method of claim 17, wherein:

the predetermined mode is a second first predetermined mode, a first predetermined mode is initiated in accordance with a determination that the thermal load exceeds a first predetermined thermal load threshold; and operating the climate system in the first predetermined mode includes activating a first compressor and a second compressor of the climate system to cool the compartment of the vehicle.

* * * * *